US012581448B2

(12) United States Patent
Shreevastav et al.

(10) Patent No.: US 12,581,448 B2
(45) Date of Patent: Mar. 17, 2026

(54) CONFIGURING POSITIONING SIGNALS AND MEASUREMENTS TO REDUCE LATENCY

(71) Applicant: TELEFONAKTIEBOLAGET LM ERICSSON (PUBL), Stockholm (SE)

(72) Inventors: Ritesh Shreevastav, Upplands Väsby (SE); Siva Muruganathan, Stittsville (CA); Per Ernstrom, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 416 days.

(21) Appl. No.: 18/018,384

(22) PCT Filed: Aug. 5, 2021

(86) PCT No.: PCT/IB2021/057225
§ 371 (c)(1),
(2) Date: Jan. 27, 2023

(87) PCT Pub. No.: WO2022/029695
PCT Pub. Date: Feb. 10, 2022

(65) Prior Publication Data
US 2023/0319764 A1     Oct. 5, 2023

Related U.S. Application Data

(60) Provisional application No. 63/062,033, filed on Aug. 6, 2020.

(51) Int. Cl.
H04W 64/00          (2009.01)
H04B 7/06           (2006.01)
(Continued)

(52) U.S. Cl.
CPC .......... H04W 64/00 (2013.01); H04B 7/0626 (2013.01); H04L 5/0051 (2013.01); H04W 76/20 (2018.02)

(58) Field of Classification Search
CPC .... H04W 64/00; H04W 24/10; H04B 7/0626; H04L 5/005; H04L 5/0051; H04L 5/0053; H04L 5/0057
See application file for complete search history.

(56) References Cited

U.S. PATENT DOCUMENTS

| | | | |
|---|---|---|---|
| 11,882,541 B2 * | 1/2024 | Khoryaev | H04L 5/0051 |
| 2014/0087754 A1 * | 3/2014 | Siomina | H04W 4/02 |
| | | | 455/456.1 |

(Continued)

OTHER PUBLICATIONS

Ericsson et al., RSTD measurement quality, 3GPP TSG RAN WG4 meeting #54 , R4-100571, San Francisco, CA, US, Feb. 22-26, 2010.

(Continued)

*Primary Examiner* — Siu M Lee
(74) *Attorney, Agent, or Firm* — Ericsson Inc.

(57) ABSTRACT

Systems and methods for configuring positioning measurements and quality/uncertainty measurements are provided. The configuration can include using reference signal configurations and signaling for positioning purposes. An access node transmits reference signal configuration information for positioning to a wireless device. The device performs positioning measurements accordingly and transmits a positioning measurement response including measurement quality information.

25 Claims, 14 Drawing Sheets

(51) Int. Cl.
    *H04L 5/00*         (2006.01)
    *H04W 76/20*     (2018.01)

(56)            References Cited

U.S. PATENT DOCUMENTS

| | | | | |
|---|---|---|---|---|
| 2014/0295883 | A1 | 10/2014 | Kang | |
| 2020/0235877 | A1* | 7/2020 | Manolakos | H04W 64/00 |
| 2021/0006372 | A1* | 1/2021 | Cha | G01S 5/0205 |
| 2021/0041522 | A1* | 2/2021 | Manolakos | G01S 1/045 |
| 2021/0051623 | A1* | 2/2021 | Manolakos | G01S 5/0236 |
| 2021/0314800 | A1* | 10/2021 | Manolakos | H04W 24/10 |
| 2021/0360573 | A1* | 11/2021 | Manolakos | H04L 5/0053 |
| 2022/0022158 | A1* | 1/2022 | Zarifi | H04L 5/0048 |
| 2022/0239438 | A1* | 7/2022 | Cha | H04J 13/10 |
| 2022/0338203 | A1* | 10/2022 | Cha | H04B 17/309 |
| 2022/0407639 | A1* | 12/2022 | Ren | G01S 5/0244 |
| 2023/0101862 | A1* | 3/2023 | Manolakos | G01S 5/0036 |
| | | | | 455/456.6 |
| 2023/0112322 | A1* | 4/2023 | Duan | H04W 64/00 |
| | | | | 455/456.1 |

OTHER PUBLICATIONS

ISR and Written Opinion, dated Nov. 19, 2021, from corresponding application PCT/IB2021/057225.

\* cited by examiner

| R | Serving Cell ID | | | | | BWP ID | | Oct 1 |
|---|---|---|---|---|---|---|---|---|
| R | R | R | R | $S_3$ | $S_2$ | $S_1$ | $S_0$ | Oct 2 |

| CSI Report ID | | | | | | | | Oct 1 |
|---|---|---|---|---|---|---|---|---|
| Rx | Rs | P | Un | AP | R | R | R | Oct 2 |
| UE RX-Tx | | | | | | | | Oct 3 |
| RSTD | | | | | | | | Oct 4 |
| RSRP | | | | | | | | Oct 5 |

| CSI Report ID | Oct 1 |
|---|---|
| UE RX-Tx | Oct 2 |

300. Receive positioning configuration

310. Receive assistance data

320. Receive measurement request

330. Perform positioning measurements

340. Transmit positioning measurement response

500. Receive positioning measurement report

510. Calculate position

520. Provide location

110

120/130

800

CONFIGURING POSITIONING SIGNALS AND MEASUREMENTS TO REDUCE LATENCY

CROSS REFERENCE TO RELATED APPLICATIONS

This application claims the benefit of U.S. Provisional Application No. 63/062,033 filed on Aug. 6, 2020, the entire contents of which are hereby incorporated by reference.

TECHNICAL FIELD

The present disclosure generally relates to wireless communications and wireless communication networks.

INTRODUCTION

Standardization bodies such as Third Generation Partnership Project (3GPP) are studying potential solutions for efficient operation of wireless communication in new radio (NR) networks. The next generation mobile wireless communication system 5G/NR will support a diverse set of use cases and a diverse set of deployment scenarios. The later includes deployment at both low frequencies (e.g. 100s of MHz), similar to LTE today, and very high frequencies (e.g. mm waves in the tens of GHz). Besides the typical mobile broadband use case, NR is being developed to also support machine type communication (MTC), ultra-low latency critical communications (URLCC), sidelink device-to-device (D2D) and other use cases.

Positioning and location services have been topics in LTE standardization since 3GPP Release 9. An objective was to fulfill regulatory requirements for emergency call positioning. Positioning in NR is proposed to be supported by the example architecture shown in FIG. 1. LMF 130A represents the location management function entity in NR. There are also interactions between the LMF 130A and the gNodeB 120 via the NRPPa protocol. The interactions between the gNodeB 120 and the device (UE) 110 are supported via the Radio Resource Control (RRC) protocol. Other network nodes, such as Access and Mobility Management Function (AMF) 130B and evolved Serving Mobile Location Center (e-SMLC) 130C, may be involved in positioning support.

Note 1: The gNB 120B and ng-eNB 120A may not always both be present.

Note 2: When both the gNB 120B and ng-eNB 120A are present, the NG-C interface is only present for one of them.

NR supports the following Radio Access Technology (RAT) dependent positioning methods:

DL-TDOA: The DL TDOA positioning method makes use of the DL RSTD (and optionally DL PRS RSRP) of downlink signals received from multiple transmission points (TPs), at the UE. The UE measures the DL RSTD (and optionally DL PRS RSRP) of the received signals using assistance data received from the positioning server, and the resulting measurements are used along with other configuration information to locate the UE in relation to the neighbouring TPs.

Multi-RTT: The Multi-RTT positioning method makes use of the UE Rx-Tx measurements and DL PRS RSRP of downlink signals received from multiple transmission/reception points (TRPs), measured by the UE and the measured gNB Rx-Tx measurements and UL SRS-RSRP at multiple TRPs of uplink signals transmitted from UE.

The UE Rx-Tx time difference is defined as $T_{UE-RX} - T_{UE-TX}$, where:

$T_{UE-RX}$ is the UE received timing of downlink subframe #i from a positioning node, defined by the first detected path in time.

$T_{UE-TX}$ is the UE transmit timing of uplink subframe #j that is closest in time to the subframe #i received from the positioning node.

The gNB Rx-Tx time difference is defined as $T_{gNB-RX} - T_{gNB-TX}$, where:

$T_{gNB-RX}$ is the positioning node received timing of uplink subframe #i containing SRS associated with UE, defined by the first detected path in time.

$T_{gNB-TX}$ is the positioning node transmit timing of downlink subframe #j that is closest in time to the subframe #i received from the UE.

UL-TDOA: The UL TDOA positioning method makes use of the UL TDOA (and optionally UL SRS-RSRP) at multiple reception points (RPs) of uplink signals transmitted from UE. The RPs measure the UL TDOA (and optionally UL SRS-RSRP) of the received signals using assistance data received from the positioning server, and the resulting measurements are used along with other configuration information to estimate the location of the UE.

DL-AoD: The DL AoD positioning method makes use of the measured DL PRS RSRP of downlink signals received from multiple TPs, at the UE. The UE measures the DL PRS RSRP of the received signals using assistance data received from the positioning server, and the resulting measurements are used along with other configuration information to locate the UE in relation to the neighbouring TPs.

UL-AoA: The UL AoA positioning method makes use of the measured azimuth and zenith of arrival at multiple RPs of uplink signals transmitted from the UE. The RPs measure A-AoA and Z-AoA of the received signals using assistance data received from the positioning server, and the resulting measurements are used along with other configuration information to estimate the location of the UE.

NR-ECID: NR Enhanced Cell ID (NR-ECID) positioning refers to techniques which use additional UE measurements and/or NR radio resource and other measurements to improve the UE location estimate.

In 3GPP Release 16 a new DL Positioning reference signal DL-PRS has been defined for NR. The DL-PRS is transmitted by gNB. The gNB provides the detailed DL-PRS related information to the LMF via OAM or NRPPa. LMF then prepares the DL-PRS configuration to the UE. Further, UL-SRS for positioning has been also defined which is configured by RRC. LMF may recommend the number of resource sets and resources for UL SRS along with spatial relations.

One of the objectives of Release 17 SI is to meet delay constraint(s) for I-IoT scenarios as stated below [RP-193237]:

To address the higher accuracy location requirements resulting from new applications and industry verticals, NR Positioning in Rel-17 should evaluate and specify enhancements and solutions to meet the following exemplary performance targets:

(a) For general commercial use cases (e.g., TS 22.261):
sub-meter level position accuracy (<1 m)

(b) For IIoT Use Cases (e.g., 22.804):
position accuracy <0.2 m

The target latency requirement is <100 ms; for some IIoT use cases, latency in the order of 10 ms is desired.

Multiple-TRP

In NR Release 16, single DCI based Multi-TRP features are specified. In these features, the DCI can be originating from one TRP while different PDSCH transmissions (i.e., either different set of layers or different PDSCH transmission occasions) may be transmitted from different TRPs. An example scenario is illustrated in FIG. 2. In these features, it is assumed that multiple TRPs belong to the same serving cell. This allows a DCI transmitted from one TRP to schedule a PDSCH transmission from one or more other TRPs that belong to the same serving cell as the TRP that transmits the DCI. In addition to scheduling PDSCH transmission from other TRPs, the DCI sent from one TRP can also trigger reference signal transmissions from other TRP(s).

Addressing latency concerns in these scenarios remains to be determined.

SUMMARY

It is an object of the present disclosure to obviate or mitigate at least one disadvantage of the prior art.

There are provided systems and methods for configuring positioning measurements.

In a first aspect there is provided a method performed by a network node, such as an access node. The access node can comprise a radio interface and processing circuitry and be configured to transmit, to a wireless device, configuration information including a reference signal (RS) for positioning associated with an active bandwidth part (BWP) of the wireless device and at least one Transmission/Reception Point (TRP). The access node transmits, to the wireless device, a positioning measurement request. The access node receives, from the wireless device, a positioning measurement response including measurement quality information, and evaluates position measurement quality in accordance with the positioning measurement response.

In some embodiments, the configuration information is transmitted via Radio Resource Control (RRC) signaling. The configuration information can include: a serving cell configuration message, a Channel State Information (CSI) measurement configuration message, a CSI reporting configuration message, a CSI resource configuration message, a measurement object message, and a positioning CSI-RS assistance data message. The configuration information can include: a serving cell configuration message, a Positioning Reference Signal (PRS) measurement configuration message, a PRS reporting configuration message, a PRS resource configuration message, a measurement object message, and a PRS assistance data message.

In some embodiments, the configuration information includes one or more of: positioning measurement parameters and quality measurement parameters.

In some embodiments, the configuration information includes an extension to a Channel State Information Reference Signal (CSI-RS) or Synchronization Signal Block (SSB) resource set for positioning purposes.

In some embodiments, the positioning measurement request is one of a Medium Access Control (MAC) Control Element (CE) message or a Downlink Control Information (DCI) message.

In some embodiments, the positioning measurement response is a MAC CE message.

In some embodiments, the positioning measurement response further includes positioning measurements. The access node can compute a position of the wireless device in accordance with the positioning measurements. The access node can transmit the computed position of the wireless device to a network node, such as the LMF. Alternatively, the network node can transmit the positioning measurements to a network node.

In some embodiments, responsive to evaluating the position measurement quality, the access node can initiate a positioning configuration change. The configuration change can include one or more of: aperiodic CSI-RS configuration, switching the BWP for measurements, increasing or decreasing resources, changing a spatial relation, and changing at least one TRP.

In some embodiments, the access node further receives, from a network node, positioning configuration include one or more of: a quality of service for positioning, a duration of positioning, and a measurement response periodicity.

In a first aspect there is provided a method performed by a wireless device. The wireless device can comprise a radio interface and processing circuitry and be configured to receive, from an access node, configuration information including a reference signal (RS) for positioning associated with an active bandwidth part (BWP) of the wireless device and at least one Transmission/Reception Point (TRP). The wireless device receives, from the access node, a positioning measurement request. The wireless device performs positioning measurements in accordance with at least one of the configuration information and the positioning measurement request message; and transmits, to the access node, a positioning measurement response including measurement quality information.

In some embodiments, the configuration information is received via Radio Resource Control (RRC) signaling. In some embodiments, the configuration information includes one or more of: positioning measurement parameters and quality measurement parameters. In some embodiments, the configuration information includes an extension to a Channel State Information Reference Signal (CSI-RS) or Synchronization Signal Block (SSB) resource set for positioning purposes.

In some embodiments, the positioning measurement request is one of a Medium Access Control (MAC) Control Element (CE) message or a Downlink Control Information (DCI) message.

In some embodiments, the wireless device is configured to perform the positioning measurements without requesting for measurement gap.

In some embodiments, the positioning measurement response is a MAC CE message. In some embodiments, the positioning measurement response further includes positioning measurements. In an alternative embodiment, the wireless device transmits the positioning measurements to a network node, such as the LMF.

In some embodiments, the wireless device is capable of device-to-device (D2D) or sidelink measurements and communication.

In some embodiments, the wireless device receives a positioning configuration change from the access node.

The various aspects and embodiments described herein can be combined alternatively, optionally and/or in addition to one another.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures, wherein.

DETAILED DESCRIPTION

Figure 1:
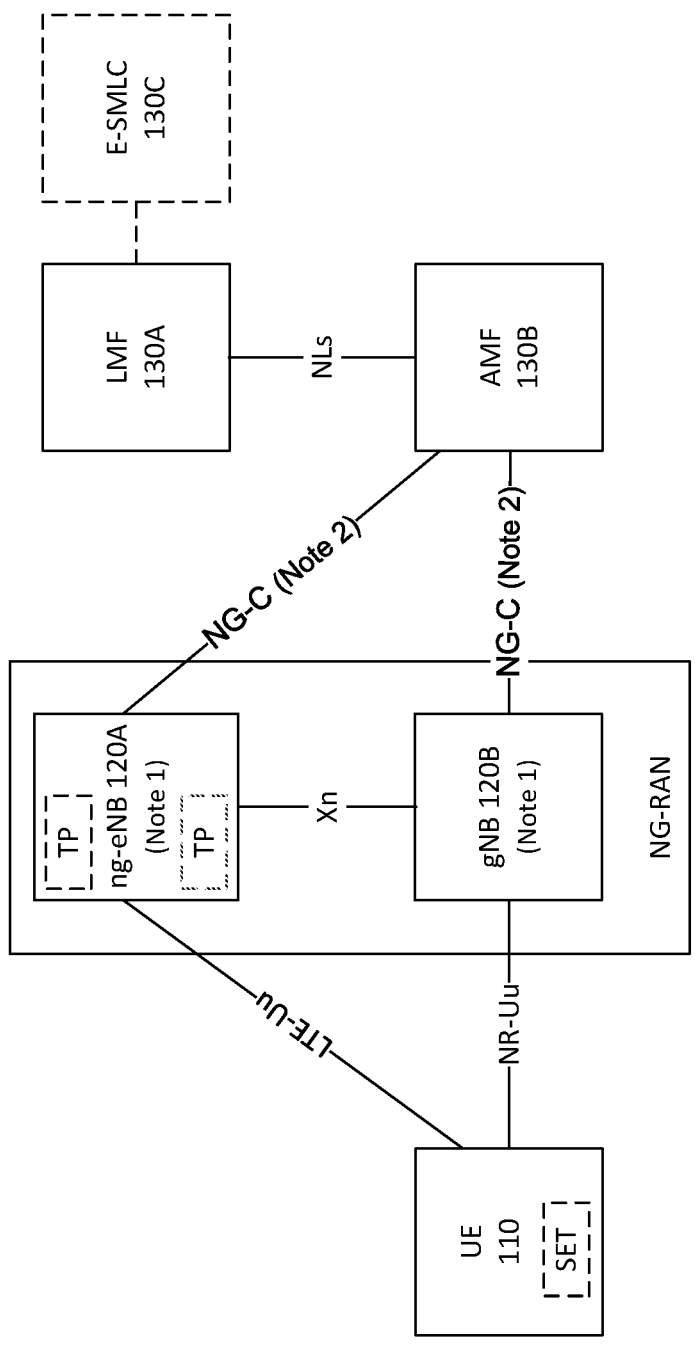
FIG. 1 illustrates an example of NR positioning architecture.
Figure 2:
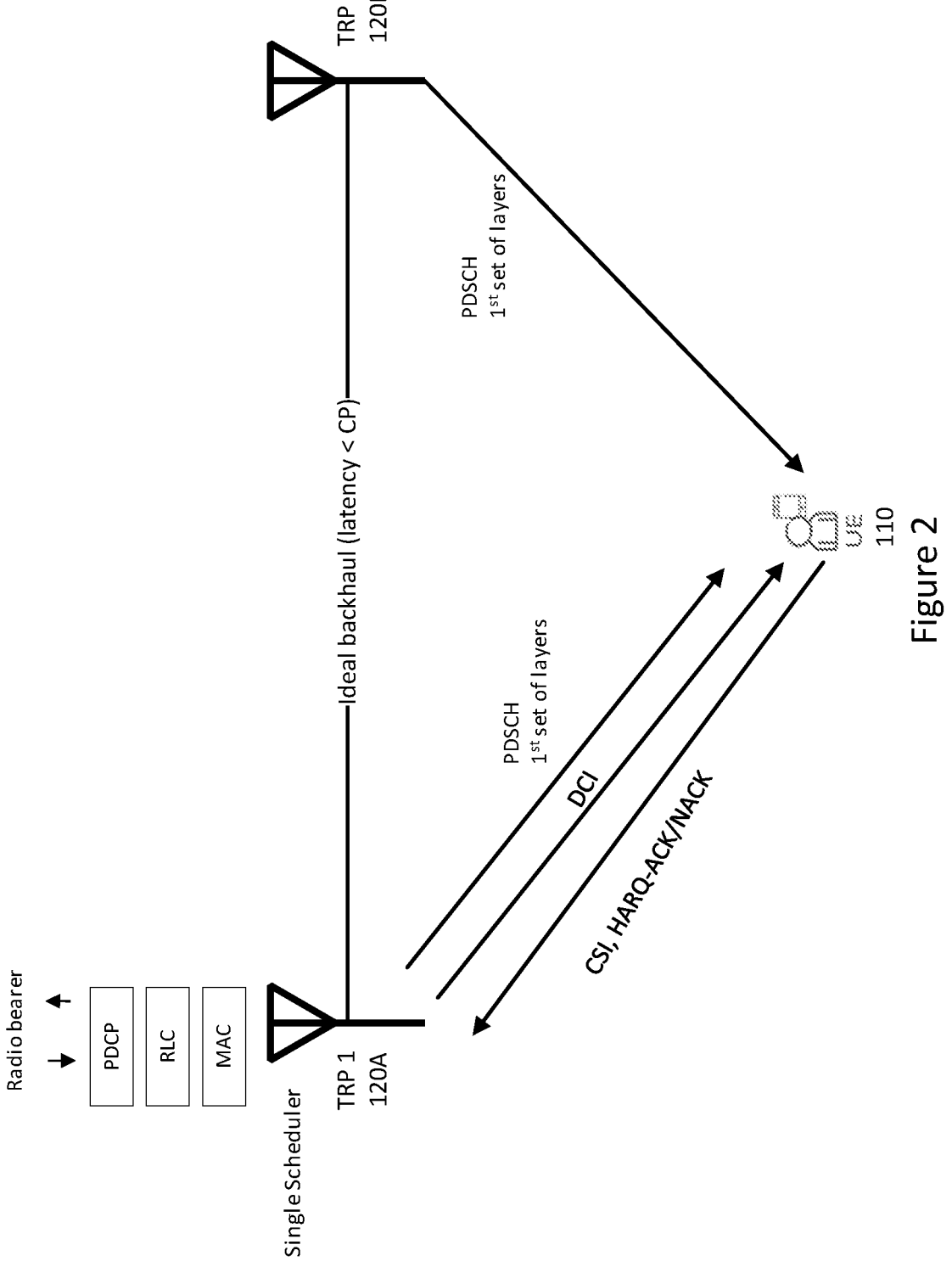
FIG. 2 illustrates an example single-DCI based Multiple TRP scheme.

The embodiments set forth below represent information to enable those skilled in the art to practice the embodiments. Upon reading the following description in light of the accompanying drawing figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In some embodiments, the non-limiting term "user equipment" (UE) is used and it can refer to any type of wireless device which can communicate with a network node and/or with another UE in a cellular or mobile or wireless communication system. Examples of UE are target device, device to device (D2D) UE, machine type UE or UE capable of machine to machine (M2M) communication, personal digital assistant, tablet, mobile terminal, smart phone, laptop embedded equipped (LEE), laptop mounted equipment (LME), USB dongles, ProSe UE, V2V UE, V2X UE, MTC UE, eMTC UE, FeMTC UE, UE Cat 0, UE Cat M1, narrow band IoT (NB-IoT) UE, UE Cat NB1, etc. Example embodiments of a UE are described in more detail below with respect to FIG. 14.

In some embodiments, the non-limiting term "network node" is used and it can correspond to any type of radio access node (or radio network node) or any network node, which can communicate with a UE and/or with another network node in a cellular or mobile or wireless communication system. Examples of network nodes are NodeB, MeNB, SeNB, a network node belonging to MCG or SCG, base station (BS), multi-standard radio (MSR) radio access node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, Self-organizing Network (SON), positioning node (e.g. E-SMLC), MDT, test equipment, etc. Example embodiments of a network node are described in more detail below with respect to FIG. 16.

In some embodiments, the term "radio access technology" (RAT) refers to any RAT e.g. UTRA, E-UTRA, narrow band internet of things (NB-IoT), WiFi, Bluetooth, next generation RAT (NR), 4G, 5G, etc. Any of the first and the second nodes may be capable of supporting a single or multiple RATs.

The term "radio node" used herein can be used to denote a wireless device or a network node.

In some embodiments, a UE can be configured to operate in carrier aggregation (CA) implying aggregation of two or more carriers in at least one of downlink (DL) and uplink (UL) directions. With CA, a UE can have multiple serving cells, wherein the term 'serving' herein means that the UE is configured with the corresponding serving cell and may receive from and/or transmit data to the network node on the serving cell e.g. on PCell or any of the SCells. The data is transmitted or received via physical channels e.g. PDSCH in DL, PUSCH in UL, etc. A component carrier (CC) also interchangeably called as carrier or aggregated carrier, PCC or SCC is configured at the UE by the network node using higher layer signaling e.g. by sending RRC configuration message to the UE. The configured CC is used by the network node for serving the UE on the serving cell (e.g. on PCell, PSCell, SCell, etc.) of the configured CC. The configured CC is also used by the UE for performing one or more radio measurements (e.g. RSRP, RSRQ, etc.) on the cells operating on the CC, e.g. PCell, SCell or PSCell and neighboring cells.

In some embodiments, a UE can also operate in dual connectivity (DC) or multi-connectivity (MC). The multi-carrier or multicarrier operation can be any of CA, DC, MC, etc. The term "multicarrier" can also be interchangeably called a band combination.

The term "radio measurement" used herein may refer to any measurement performed on radio signals. Radio measurements can be absolute or relative. Radio measurements can be e.g. intra-frequency, inter-frequency, CA, etc. Radio measurements can be unidirectional (e.g., DL or UL or in either direction on a sidelink) or bidirectional (e.g., RTT, Rx-Tx, etc.). Some examples of radio measurements: timing measurements (e.g., propagation delay, TOA, timing advance, RTT, RSTD, Rx-Tx, etc.), angle measurements (e.g., angle of arrival), power-based or channel quality measurements (e.g., path loss, received signal power, RSRP, received signal quality, RSRQ, SINR, SNR, interference power, total interference plus noise, RSSI, noise power, CSI, CQI, PMI, etc.), cell detection or cell identification, RLM, SI reading, etc. The measurement may be performed on one or more links in each direction, e.g., RSTD or relative RSRP or based on signals from different transmission points of the same (shared) cell.

The term "signaling" used herein may comprise any of high-layer signaling (e.g., via RRC or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term "time resource" used herein may correspond to any type of physical resource or radio resource expressed in terms of length of time. Examples of time resources include symbol, time slot, sub-frame, radio frame, TTI, interleaving time, etc. The term "frequency resource" may refer to sub-band within a channel bandwidth, subcarrier, carrier frequency, frequency band. The term "time and frequency resources" may refer to any combination of time and frequency resources.

Some examples of UE operation include: UE radio measurement (see the term "radio measurement" above), bidirectional measurement with UE transmitting, cell detection or identification, beam detection or identification, system information reading, channel receiving and decoding, any UE operation or activity involving at least receiving of one or more radio signals and/or channels, cell change or (re) selection, beam change or (re) selection, a mobility-related operation, a measurement-related operation, a radio resource management (RRM)-related operation, a positioning procedure, a timing related procedure, a timing adjustment related procedure, UE location tracking procedure, time tracking related procedure, synchronization related procedure, MDT-like procedure, measurement collection related procedure, a CA-related procedure, serving cell activation/deactivation, CC configuration/de-configuration, etc.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell". However, particularly with respect to 5G/NR concepts, beams may be used instead of cells and, as such, it is important to note that the concepts described herein are equally applicable to both cells and beams.

Figure 3A:
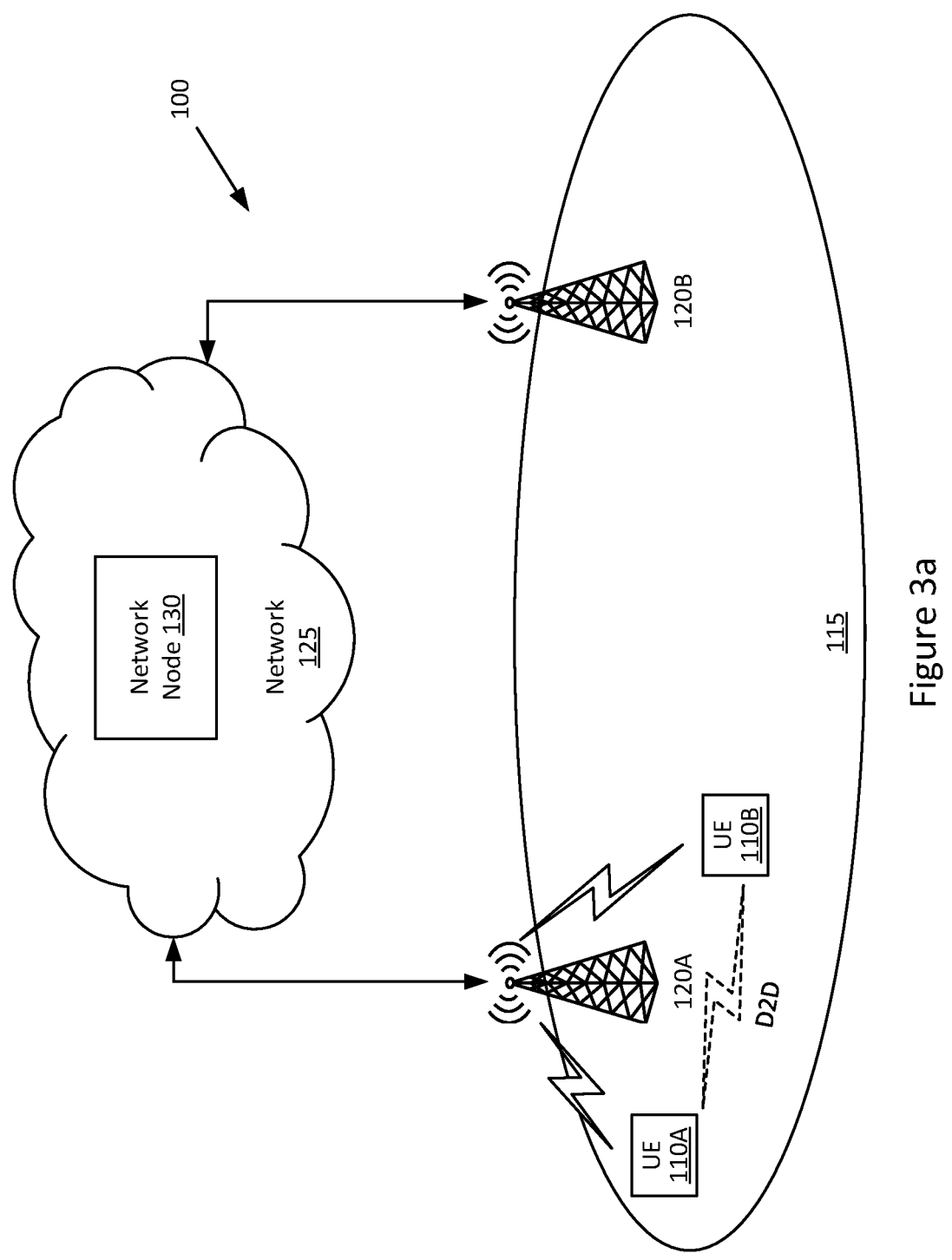
FIG. 3a illustrates an example wireless network.

FIG. 3a illustrates an example of a wireless network 100 that can be used for wireless communications. Wireless network 100 includes wireless devices, such as UEs 110A-110B, and network nodes, such as radio access nodes 120A-120B (e.g. eNBs, gNBs, etc.), connected to one or more core network nodes 130 via an interconnecting network 125. The network 100 can use any suitable deployment scenarios. UEs 110 within coverage area 115 can each be capable of communicating directly with radio access nodes 120 over a wireless interface. In some embodiments, UEs 110 can also be capable of communicating with each other via D2D communication.

As an example, UE 110A can communicate with radio access node 120A over a wireless interface. That is, UE 110A can transmit wireless signals to and/or receive wireless signals from radio access node 120A. The wireless signals can contain voice traffic, data traffic, control signals, and/or any other suitable information. In some embodiments, an area of wireless signal coverage 115 associated with a radio access node 120 can be referred to as a cell.

The interconnecting network 125 can refer to any interconnecting system capable of transmitting audio, video, signals, data, messages, etc., or any combination of the preceding. The interconnecting network 125 can include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the network node 130 can be a core network node 130, managing the establishment of communication sessions and other various other functionalities for UEs 110. Examples of core network node 130 can include mobile switching center (MSC), MME, serving gateway (SGW), packet data network gateway (PGW), operation and maintenance (O&M), operations support system (OSS), SON, positioning node (e.g., Enhanced Serving Mobile Location Center, E-SMLC), location server node, MDT node, etc. UEs 110 can exchange certain signals with the core network node using the non-access stratum layer. In non-access stratum signaling, signals between UEs 110 and the core network node 130 can be transparently passed through the radio access network. In some embodiments, radio access nodes 120 can interface with one or more network nodes 130 over an internode interface.

In some embodiments, radio access node 120 can be a "distributed" radio access node in the sense that the radio access node 120 components, and their associated functions, can be separated into two main units (or sub-radio network nodes) which can be referred to as the central unit (CU) and the distributed unit (DU). Different distributed radio network node architectures are possible. For instance, in some architectures, a DU can be connected to a CU via dedicated wired or wireless link (e.g., an optical fiber cable) while in other architectures, a DU can be connected a CU via a transport network. Also, how the various functions of the radio access node 120 are separated between the CU(s) and DU(s) may vary depending on the chosen architecture.

Figure 3B:
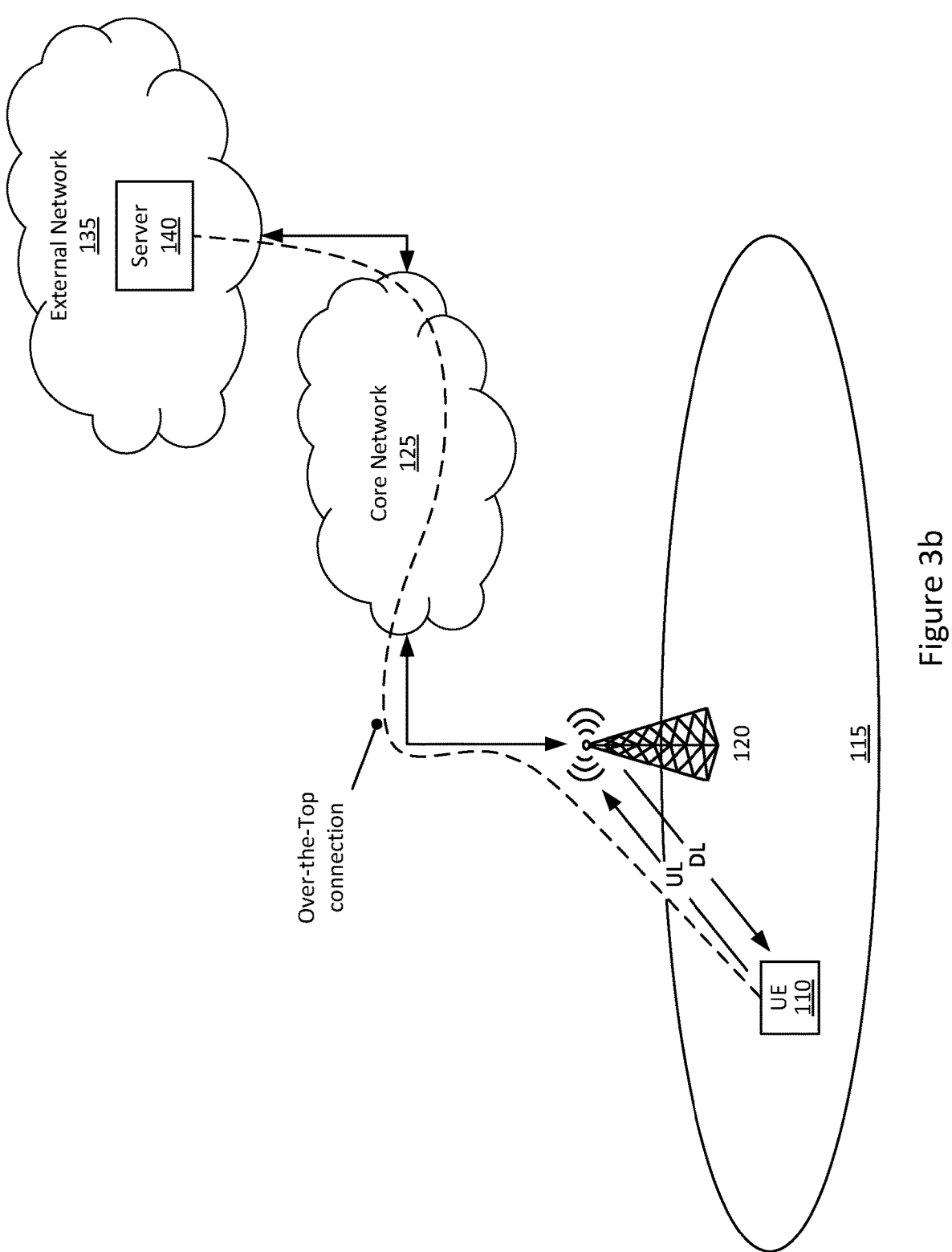
FIG. 3b illustrates an example of signaling in a wireless network.

FIG. 3b illustrates an example of signaling in wireless network 100. As illustrated, the radio interface generally enables the UE 110 and the radio access node 120 to exchange signals and messages in both a downlink direction (from the radio access node 120 to the UE 110) and in an uplink direction (from the UE 110 to the radio access node 120).

The radio interface between the wireless device 110 and the radio access node 120 typically enables the UE 110 to access various applications or services provided by one or more servers 140 (also referred to as application server or host computer) located in an external network(s) 135. The connectivity between the UE 110 and the server 140, enabled at least in part by the radio interface between the UE 110 and the radio access node 120, can be described as an "over-the-top" (OTT) or "application layer" connection. In such cases, the UE 110 and the server 140 are configured to exchange data and/or signaling via the OTT connection, using the radio access network 100, the core network 125, and possibly one or more intermediate networks (e.g. a transport network, not shown). The OTT connection may be transparent in the sense that the participating communication devices or nodes (e.g., the radio access node 120, one or more core network nodes 130, etc.) through which the OTT connection passes may be unaware of the actual OTT connection they enable and support. For example, the radio access node 120 may not or need not be informed about the previous handling (e.g., routing) of an incoming downlink communication with data originating from the server 140 to be forwarded or transmitted to the UE 110. Similarly, the radio access node 120 may not or need not be aware of the subsequent handling of an outgoing uplink communication originating from the UE 110 towards the server 140.

Many of the positioning applications require that localization be done spontaneously. Latency can be a critical factor. In the conventional NR positioning architecture, the positioning methodology is mainly driven by the LMF node. The LMF selects the positioning method and provides the configuration.

The LMF node requires positioning measurements from both base station (gNB) and the wireless device (UE) to compute the position. The LMF node also receives the quality of measurement from the UE for DL-PRS such as RSRP and uncertainty related to positioning estimates. However, the LMF does not immediately take any action based upon the feedback received on DL-PRS. No mechanism has been provided yet to dynamically vary the DL PRS configurations. Besides, even if the LMF wants to take any specific action such as alter DL-PRS configuration, the delay is one factor which may hinder the use of DL-PRS based measurements in NR Rel-16 in positioning I-IoT use cases that demand low latency. The DL-PRS configuration is relayed by multiple nodes before it reaches the UE. The LMF generates the LPP message which then, based upon control plane solution, needs to be relayed to the AMF. AMF then relays to gNB, and then gNB finally to the UE. Such relaying through multiple nodes can result in considerable latency.

Another potential problem using the Release 16 DL-PRS is that the UE always has to request for measurement gap, as DL-PRS is configured using multiple frequency layers which the UE may not support. Requesting measurement gap implies that the UE will not be able to receive/transmit data or other reference signals during that time. Moreover, it introduces delay. Large latency can be a hindrance for I-IoT scenarios demanding low latency positioning and hence DL-PRS based configuration for positioning may not be suitable.

Some embodiments provided herein will describe how Multi-TRP configurations can be applied for solving positioning problems. The signaling sequence for Multi-TRP configuration is provided where legacy NR reference signals such as CSI-RS can be configured for positioning to reduce latency. The configuration can be provided by the gNB using RRC rather than using LPP from LMF. Further, the measurement reporting from UE can be provided in a faster way such as by using either L1 channels such as PUCCH, MAC CE or RRC, rather than using higher layer protocols such as LPP.

The gNB can take immediate action based upon the obtained measurement results, such as initiating an aperiodic CSI-RS configuration for positioning purpose or performing dynamic changes (e.g. providing new CSI-RS configurations, switching BWP for measurements, etc.).

Further mechanisms are provided to handle cases where the gNB may not be allowed to obtain the positioning measurements due to security/privacy reasons, for example. In such cases, the gNB can obtain the quality/uncertainty/RSRP measurements and the LMF can receive the detailed positioning measurements. The quality statistic in the gNB allows it to take a dynamic action such as increasing or decreasing resource(s).

Figure 4:
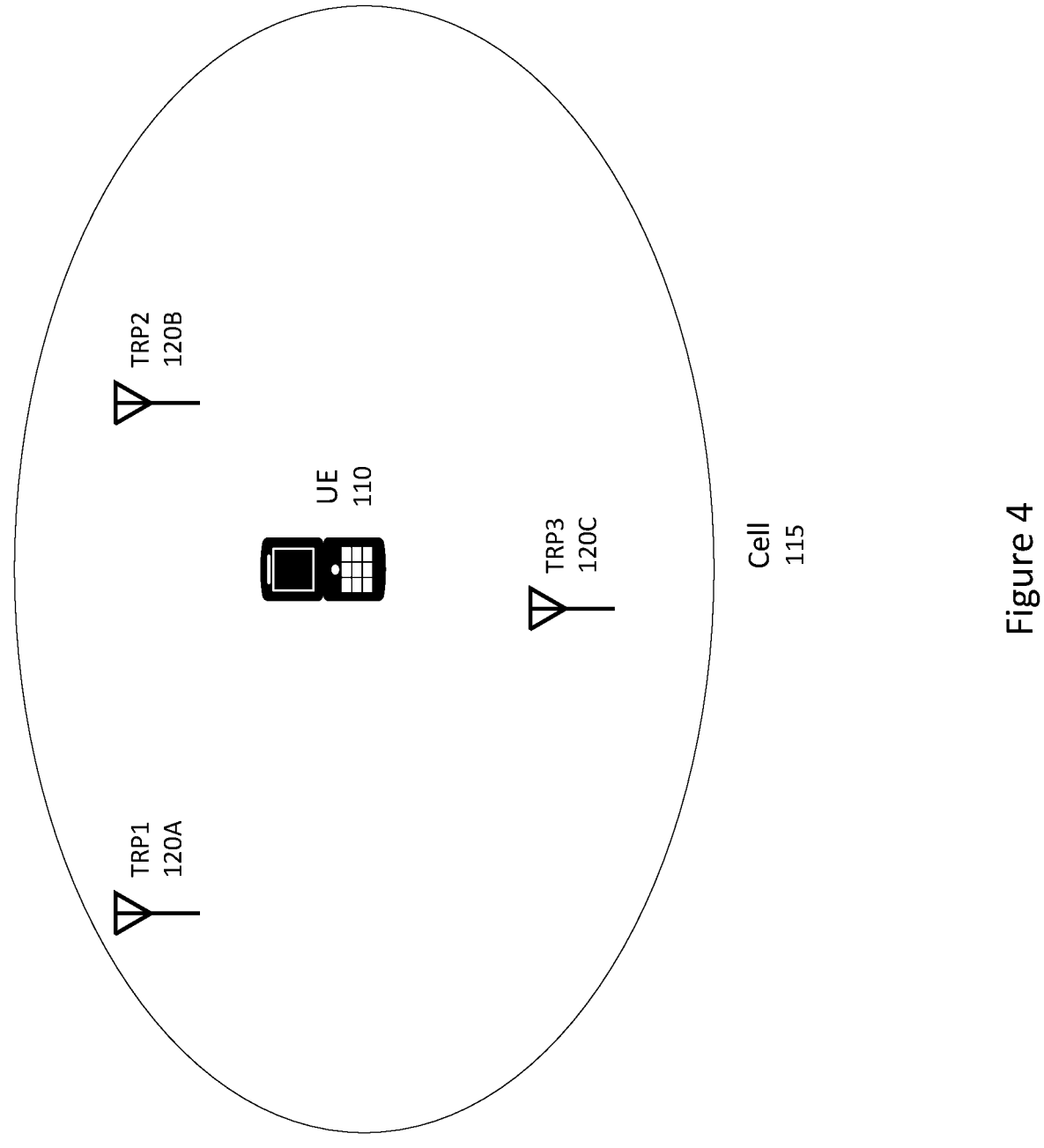
FIG. 4 is an example of a cell with multiple TRP.

FIG. 4 illustrates an example cell consisting of multiple TRPs 120A-C, with each TRP 120 located in distinct coordinates in cell 115. This type of configuration is expected to be used in I-IoT scenarios. As an example, one cell with 10, 20 or even more TRPs 120 can be used to cover a complete factory hall.

For positioning, as such three distinct co-ordinates are required to perform multilateration. In this type of scenario where a serving cell has multiple TRPs located in distinct co-ordinates, it should be possible to exploit this for positioning.

Signaling Sequence

For reduced latency, it is desired that most of the operations take place closer to the UE. However, the notion that radio node does radio related functionality and positioning node computes the location can be maintained. For security and other aspects, the gNB may not be allowed to compute the position and it may have to be done on a core network node such as LMF. However, for I-IoT scenario it may be permitted that gNB computes the position of the devices. Both of these scenarios will be considered in the embodiments described herein.

gNB Based Positioning Procedure Setup

In some embodiments, the positioning node (e.g. LMF) requests the serving gNB for the positioning procedure to be setup. The LMF may inform to the gNB during positioning setup one or more of the following: QoS for positioning, the duration of positioning, and/or the measurement report durations/periodicity that gNB need to provide to LMF, etc.

Based upon this information, gNB selects the positioning method along with the needed reference signals for either both symmetrical methods involving UL and DL or one of them (DL-TDOA, UTDOA). The gNB provides the configuration to the UE via RRC. The serving gNB as such has the reference signal configuration information for SSB, CSI-RS as part of legacy beam management, CSI reporting and RRM procedures. Hence, the gNB can prepare the configuration based upon serving cell configuration.

One approach is to extend the CSI-RS configurations used for CSI/beam reporting (i.e. beam management). For this, in one embodiment, the serving cell configuration (ServingCellConfig IE) is updated to include the multiple TRPs and their associated CSI-RS/SSB configurations as will be shown below. In one embodiment, a sequence of CSI measurement configurations (i.e. CSI-MeasConfig IEs) are configured as part of the serving cell configuration. Each of these CSI-MeasConfig's can correspond to a given TRP. The maximum number of CSI-MeasConfig's (i.e. maximum number of TRPs) given by "maxTRPs" in the ASN-1 example below can be predefined in 3GPP specifications (for example, maxTRPs=20 or 64). Within each CSI-MeasConfig, a sequence of CSI reporting configurations (e.g. CSI-ReportPosConfig) may be defined as shown by csi-ReportConfigPosToAddModList and csi-ReportConfigPosToReleaseList in the ASN-1 example below. Within each CSI-ReportPosConfig, the type of positioning related measurements to be reported are included in the reportQuantity field. The reportQuantity field can be used to choose one of the positioning measurement type to be reported such as UE Rx-Tx, RSTD, etc.

Example ServingCellConfig

```
ServingCellConfig : : =                 SEQUENCE {
    tdd-UL-DL-ConfigurationDedicated        TDD-UL-DL-ConfigDedicated
OPTIONAL,    -- Cond TDD
    initialDownlinkBWP                      BWP-DownlinkDedicated
OPTIONAL,    -- Need M
    downlinkBWP-ToReleaseList               SEQUENCE (SIZE (1..maxNrofBWPs)) OF
BWP-Id          OPTIONAL,               -- Need N
    downlinkBWP-ToAddModList                SEQUENCE (SIZE (1..maxNrofBWPs)) OF
BWP-Downlink    OPTIONAL,               -- Need N
    firstActiveDownlinkBWP-Id               BWP-Id
OPTIONAL,    -- Cond SyncAndCellAdd
    bwp-InactivityTimer                     ENUMERATED {ms2, ms3, ms4, ms5, ms6,
ms8, ms10, ms20, ms30,
                                                ms40, ms50, ms60,
ms80, ms100, ms200, ms300, ms500,
                                                    ms750, ms1280, ms1920,
ms2560, spare10, spare9, spare8,
                                                    spare7, spare6, spare5,
spare4, spare3, spare2, spare1 }        OPTIONAL    --Need R
    defaultDownlinkBWP-Id                   BWP-Id
OPTIONAL,    -- Need S
    uplinkConfig                            UplinkConfig
OPTIONAL,    -- Need M
    supplementaryUplink                     UplinkConfig
OPTIONAL,    -- Need M
    pdcch-ServingCellConfig                 SetupRelease { PDCCH-
ServingCellConfig }                         OPTIONAL,    -- Need M
    pdsch-ServingCellConfig                 SetupRelease { PDSCH-
ServingCellConfig }                         OPTIONAL,    -- Need M
    csi-MeasConfig                          SetupRelease { CSI-MeasConfig }
OPTIONAL,    -- Need M
    sCellDeactivationTimer                  ENUMERATED {ms20, ms40, ms80, ms160,
ms200, ms240,
                                                ms320, ms400, ms480,
ms520, ms640, ms720,
                                                    ms840, ms1280,
spare2, spare1}        OPTIONAL,        -- Cond ServingCellWithoutPUCCH
    crossCarrierSchedulingConfig            CrossCarrierSchedulingConfig
OPTIONAL,    -- Need M
    tag-Id                                  TAG-Id,
    dummy                                   ENUMERATED {enabled}
OPTIONAL,    -- Need R
    pathlossReferenceLinking                ENUMERATED {spCell, sCell}
OPTIONAL,    -- Cond SCellOnly
    servingCellMO                           MeasObjectId
OPTIONAL,    -- Cond MeasObject
    . . . ,
    [ [
    lte-CRS-ToMatchAround                   SetupRelease { RateMatchPatternLTE-
CRS }                                   OPTIONAL,    -- Need M
    rateMatchPatternToAddModList            SEQUENCE (SIZE
(1..maxNrofRateMatchPatterns)) OF RateMatchPattern    OPTIONAL,    -- Need
N
    rateMatchPatternToReleaseList           SEQUENCE (SIZE
(1..maxNrofRateMatchPatterns)) OF RateMatchPatternId    OPTIONAL,    -- Need
N
    downlinkChannelBW-PerSCS-List           SEQUENCE (SIZE (1..maxSCSs)) OF SCS-
SpecificCarrier                         OPTIONAL    -- Need S
    ] ],
    [ [
    supplementaryUplinkRelease              ENUMERATED {true}
OPTIONAL,    -- Need N
    tdd-UL-DL-ConfigurationDedicated-iab-mt-v16xy        TDD-UL-DL-
ConfigDedicated-IAB-MT-v16xy                    OPTIONAL,    -- Need FFS
    firstWithinActiveTimeBWP-Id-r16         BWP-Id
OPTIONAL,    -- Cond MultipleNonDormantBWP
    firstOutsideActiveTimeBWP-Id-r16        BWP-Id
OPTIONAL,    -- Cond MultipleNonDormantBWP-WUS
    ca-SlotOffset-r16                       CHOICE {
        refSCS15kHz                             INTEGER (−2..2),
        refSCS30KHz                             INTEGER (−5..5),
        refSCS60KHz                             INTEGER (−10..10),
        refSCS120KHz                            INTEGER (−20..20)
    }
OPTIONAL, -- Cond AsyncCA
    channelAccessConfig-r16                 ChannelAccessConfig-r16
OPTIONAL -- Need M
    ] ],
    [ [
```

-continued

```
csi-Meas PosConfigPerTRP          SEQUENCE (SIZE (1..maxTRPs) ) OF CSI-
MeasConfig        OPTIONAL        -- Need R
   ] ]
}
```

The existing CSI-RS/SSB configuration that is provided by a serving gNB to the UE via below CSI-MeasConfig such as (nzp-CSI-RS-ResourceSetToAddModList, csi-SSB-ResourceSetToAddModList) can also be re-used for positioning measurement purposes to compute UE Rx-Tx or RSTD.

However, as these positioning measurements that UE needs to perform need to be signaled/configured which can be done by extending the below CSI-MeasConfig structure.

Example CSI-MeasConfig

```
CSI-MeasConfig : : =                                      SEQUENCE {
      nzp-CSI-RS-ResourceToAddModList                        SEQUENCE (SIZE (1..maxNrofNZP-CSI-RS-
Resources)) OF NZP-CSI-RS-Resource                   OPTIONAL,    -- Need N
      nzp-CSI-RS-ResourceToReleaseList                       SEQUENCE (SIZE (1..maxNrofNZP-CSI-RS-
Resources)) OF NZP-CSI-RS-ResourceId                 OPTIONAL,    -- Need N
      nzp-CSI-RS-ResourceSetToAddModList                     SEQUENCE (SIZE (1..maxNrofNZP-CSI-RS-
ResourceSets)) OF NZP-CSI-RS-ResourceSet
OPTIONAL,    -- Need N
      nzp-CSI-RS-ResourceSetToReleaseList                    SEQUENCE (SIZE (1..maxNrofNZP-CSI-RS-
ResourceSets)) OF NZP-CSI-RS-ResourceSetId
OPTIONAL,    -- Need N
      csi-IM-ResourceToAddModList                            SEQUENCE (SIZE (1..maxNrofCSI-IM-
Resources)) OF CSI-IM-Resource                         OPTIONAL,    -- Need N
      csi-IM-ResourceToReleaseList                           SEQUENCE (SIZE (1..maxNrofCSI-IM-
Resources)) OF CSI-IM-ResourceId                       OPTIONAL,    -- Need N
      csi-IM-ResourceSetToAddModList                         SEQUENCE (SIZE (1..maxNrofCSI-IM-
ResourceSets)) OF CSI-IM-ResourceSet                   OPTIONAL,    -- Need N
      csi-IM-ResourceSetToReleaseList                        SEQUENCE (SIZE (1..maxNrofCSI-IM-
ResourceSets)) OF CSI-IM-ResourceSetId                 OPTIONAL,    -- Need N
      csi-SSB-ResourceSetToAddModList                        SEQUENCE (SIZE (1..maxNrofCSI-SSB-
ResourceSets)) OF CSI-SSB-ResourceSet                OPTIONAL,    -- Need N
      csi-SSB-ResourceSetToReleaseList                       SEQUENCE (SIZE (1..maxNrofCSI-SSB-
ResourceSets)) OF CSI-SSB-ResourceSetId              OPTIONAL,    -- Need N
      csi-ResourceConfigToAddModList                         SEQUENCE (SIZE (1..maxNrofCSI-
ResourceConfigurations)) OF CSI-ResourceConfig
OPTIONAL,    -- Need N
      csi-ResourceConfigToReleaseList                        SEQUENCE (SIZE (1..maxNrofCSI-
ResourceConfigurations)) OF CSI-ResourceConfigId
OPTIONAL,    -- Need N
      csi-ReportConfigToAddModList                           SEQUENCE (SIZE (1..maxNrofCSI-
ReportConfigurations)) OF CSI-ReportConfig                 OPTIONAL,    -- Need N
      csi-ReportConfigToReleaseList                          SEQUENCE (SIZE (1..maxNrofCSI-
ReportConfigurations)) OF CSI-ReportConfigId
OPTIONAL,    -- Need N
      reportTriggerSize                                      INTEGER (0..6)
OPTIONAL,    -- Need M
      aperiodicTriggerStateList                              SetupRelease { CSI-
AperiodicTriggerStateList }                                         OPTIONAL,    -- Need M
      semiPersistentOnPUSCH-TriggerStateList                     SetupRelease { CSI-
SemiPersistentOnPUSCH-TriggerStateList }                          OPTIONAL,    -- Need M
      . . . ,
      [ [
      reportTriggerSizeForDCI-Format0-2-r16                         INTEGER (0..6)
OPTIONAL,    -- Need M
      aperiodicTriggerStateListForDCI-Format0-2-r16 SetupRelease { CSI-
AperiodicTriggerStateList }                                        OPTIONAL,    -- Need M
      semiPersistentOnPUSCH-TriggerStateListForDCI-Format0-2-r16 SetupRelease
{ CSI-Semi PersistentOnPUSCH-TriggerStateList }
OPTIONAL    -- Need M
      ] ],
      [ [
   csi-ReportConfigPosToAddModList                           SEQUENCE (SIZE (1..maxNrofPosCSI-
ReportConfigurations) ) OF CSI-ReportPosConfig                 OPTIONAL,    -- Need N
csi-ReportConfigPosToReleaseList                             SEQUENCE (SIZE (1..maxNrofPosCSI-
ReportConfigurations) ) OF CSI-ReportPosConfigId
      ] ]
      }
```

Example CSI-ReportPosConfig

```
CSI-ReportPosConfig : : =              SEQUENCE {
   reportConfigId                      CSI-ReportConfigId,
   carrier                             ServCellIndex
OPTIONAL, -- Need S
   resourcesForChannelMeasurement      CSI-ResourceConfigId,
   reportConfigType                    CHOICE {
      periodic                         SEQUENCE {
         reportSlotConfig              CSI-
ReportPeriodicityAndOffset,
         pucch-CSI-ResourceList        SEQUENCE (SIZE
(1..maxNrofBWPs)) OF PUCCH-CSI-Resource
      },
      semiPersistentOnPUCCH            SEQUENCE {
         reportSlotConfig              CSI-
ReportPeriodicityAndOffset,
         pucch-CSI-ResourceList        SEQUENCE (SIZE
(1..maxNrofBWPs)) OF PUCCH-CSI-Resource
      },
      semiPersistentOnPUSCH            SEQUENCE {
         reportSlotConfig                 ENUMERATED { sl5, sl10,
sl20, sl40, sl80, sl160, sl320} ,
         reportSlotOffsetList          SEQUENCE (SIZE (1..
maxNrofUL-Allocations)) OF INTEGER (0..32),
         p0alpha                       P0-PUSCH-AlphaSetId
      },
      aperiodic                        SEQUENCE {
         reportSlotOffsetList          SEQUENCE (SIZE (1..maxNrofUL-
Allocations)) OF INTEGER (0..32)
      }
   },
   reportQuantity                      CHOICE {
      ueRx-Tx                          NULL,
      rstd                             NULL,
      csirs-rsrp                       NULL,
      ssb-Index-RSRP                   NULL,
         ueRx-TxPlusUncertainty        NULL,
         rstdPlusUncertainty           NULL,
      additionalPath                   NULL
   },
},
```

---

CSI-ReportPosConfig field descriptions

--- reportQuantity
Different positioning measurements may be configured such as UE Rx-Tx, RSTD, RSRP along with
quality/uncertainty measurements. Further additional path reporting may be configured to be reported by
UE. TS 37.355 (LPP) can be refereed for reference or detailed description.

---

It is noted that the example CSI-ReportPosConfig information element proposed above is different from the conventional CSI-ReportConfig information element as defined in 3GPP TS 38.331. One of the differences is that in the proposed CSI-ReportPosConfig, only the resources for channel measurement are needed (e.g., resourcesForChannelMeasurement), while resources for interference measurement are not configured in CSI-ReportPosConfig. This is because interference measurement is not needed for positioning measurements. In the existing CSI-ReportConfig in 3GPP TS 38.331, interference measurement resources may be configured. Furthermore, the report quantities in the proposed CSI-ReportPosConfig are related to positioning measurements, while the report quantities in the existing CSI-Report Config in 3GPP TS38.331 are related to CSI feedback and beam reporting.

In another embodiment, each TRP may be implicitly represented by a either an NZP-CSI-RS resource set or an CSI-SSB-ResourceSet as shown in the examples below.

It is noted that in this alternative embodiment, the list of NZP CSI-RS resource set or CSI-SSB-ResourceSet to be used for positioning measurements are defined separately by nzp-CSI-RS-SSB-Pos from those used for the purpose of CSI feedback or beam management (which is given by nzp-CSI-RS-SSB). A reason for defining these lists separately for positioning is because the maximum number of resource sets possible in a list may be different for positioning when compared to CSI feedback or beam management. For instance, in current NR, the number of NZP-CSI-RS resource sets allowed for CSI feedback or beam reporting is limited to 16 (since maxNrofNZP-CSI-RS-ResourceSets-PerConfig INTEGER:: =16). However, in an indoor I-IoT scenario with more than 16 TRPs, the existing list sizes under nzp-CSI-RS-SSB are insufficient. Hence, under the new lists that can be chosen from nzp-CSI-RS-SSB-Pos, the desired maximum list size maxTRP can be used extended to a value more than 16 (e.g. maxTRP=20). Note that this alternative embodiment allows multiple NZP-CSI-RS resource sets per CSI-Resource configuration when the resourceType in CSI-ResourceConfig is set to any of aperiodic, semi-persistent, or periodic. However, existing NR only allows multiple NZP-CSI-RS resource sets per CSI-Resource configuration when the resource Type is aperiodic, while the number of NZP-CSI-RS resource sets per CSI-Resource configuration is 1 when resourceType is periodic or semi-persistent. Since this proposed alternative embodiment allows multiple NZP-CSI-RS resource sets per CSI-Resource configuration, then the resource set to be used for positioning measurements can be indicated in the second example CSI-ReportPosConfig shown below.
Example CSI-ResourceConfig

```
-- ASN1START
-- TAG-CSI-RESOURCECONFIG-START
CSI-ResourceConfig : : =           SEQUENCE {
    csi-ResourceConfigId               CSI-ResourceConfigId,
    csi-RS-ResourceSetList             CHOICE {
        nzp-CSI-RS-SSB                     SEQUENCE {
            nzp-CSI-RS-ResourceSetList         SEQUENCE (SIZE (1..maxNrofNZP-CSI-RS-
ResourceSets PerConfig)) OF NZP-CSI-RS-ResourceSetId    OPTIONAL,    -- Need R
            csi-SSB-ResourceSetList            SEQUENCE (SIZE (1..maxNrofCSI-SSB-
ResourceSets PerConfig)) OF CSI-SSB-ResourceSetId    OPTIONAL    -- Need R
        },
        csi-IM-ResourceSetList             SEQUENCE (SIZE (1..maxNrofCSI-IM-
ResourceSets PerConfig)) OF CSI-IM-ResourceSetId,
    },
    bwp-Id                             BWP-Id,
        resourceType                       ENUMERATED { aperiodic, semiPersistent,
periodic },
        . . . ,
        [ [
    nzp-CSI-RS-SSB-Pos                 SEQUENCE {
            nzp-CSI-RS-ResourceSetList         SEQUENCE (SIZE (1..maxTRPs) ) OF NZP-
CSI-RS-ResourceSetId    OPTIONAL,    -- Need R
            csi-SSB-ResourceSetList            SEQUENCE (SIZE (1..maxTRPs) ) OF CSI-
SSB-ResourceSetId         OPTIONAL    -- Need R
        ] ]
}
-- TAG-CSI-RESOURCECONFIG-STOP
-- ASN1STOP
```

| CSI-ResourceConfig field descriptions |
| --- |
| nzp-CSI-RS-SSB-Pos<br>Extension of NZP-CSI-RS resource sets or CSI-SSB-ResourceSets for positioning purpose. The maxNrofNZP-CSI-RS-ResourceSetsPerConfig = 16 may be extended for positioning purpose to cover up to 20 TRPs for instance. |

Example CSI-ResourcePosConfig

```
CSI-ReportPosConfig : : =               SEQUENCE {
    reportConfigId                          CSI-ReportConfigId,
    resourceSet                             INTEGER (1..maxTRPs),
    carrier                                 ServCellIndex
OPTIONAL,    -- Need S
    resourcesForChannelMeasurement          CSI-ResourceConfigId,
    reportConfigType                        CHOICE {
        periodic                                SEQUENCE {
            reportSlotConfig                        CSI-
ReportPeriodicityAndOffset,
            pucch-CSI-ResourceList                  SEQUENCE (SIZE
(1..maxNrofBWPs)) OF PUCCH-CSI-Resource
        },
        semiPersistentOnPUCCH                   SEQUENCE {
            reportSlotConfig                        CSI-
ReportPeriodicityAndOffset,
            pucch-CSI-ResourceList                  SEQUENCE (SIZE
(1..maxNrofBWPs)) OF PUCCH-CSI-Resource
        },
        semiPersistentOnPUSCH                   SEQUENCE {
            reportSlotConfig                        ENUMERATED { sl5, sl10,
sl20, sl40, sl80, sl160, sl320},
            reportSlotOffsetList                    SEQUENCE (SIZE (1..
maxNrofUL-Allocations)) OF INTEGER (0..32),
            p0alpha                                 P0-PUSCH-AlphaSetId
        },
        aperiodic                               SEQUENCE {
            reportSlotOffsetList                    SEQUENCE (SIZE (1..maxNrofUL-
```

-continued

```
Allocations)) OF INTEGER (0..32)
        }
    },
    resportQuantity              CHOICE {
        ueRx-Tx                      NULL,
        rstd                         NULL,
        csirs-rsrp                       NULL,
        ssb-Index-RSRP                   NULL,
        ueRx-TxPlusUncertainty       NULL,
        rstdPlusUncertainty              NULL,
        additionalPath               NULL,
},
```

Using this alternative embodiment, for example, if there are three resource sets configured for the cell, one may split such that each resource set is allocated to one of the TRPs.

Although the example alternative embodiment above uses one resource set per TRP, this embodiment can be extended to other ways to represent a TRP. In a further alternative embodiment, a TRP may be represented by a CSI-ResourceConfig information element.

Another alternative approach is to define CSI-RS dedicated for Positioning purposes. An example ASN-1 for this approach is shown below.

Example MeasObjectNR

The IE MeasObjectNR specifies information applicable for SS/PBCH block(s) intra/inter-frequency measurements and/or CSI-RS intra/inter-frequency measurements.

```
-- ASN1START
-- TAG-MEASOBJECTNR-START
MeasObjectNR : : =                        SEQUENCE {
    ssbFrequency                              ARFCN-ValueNR
OPTIONAL,    -- Cond SSBorAssociatedSSB
    ssbSubcarrierSpacing                      SubcarrierSpacing
OPTIONAL,    -- Cond SSBorAssociatedSSB
    smtc1                                     SSB-MTC
OPTIONAL,    -- Cond SSBorAssociatedSSB
    smtc2                                     SSB-MTC2
OPTIONAL,    -- Cond IntraFreqConnected
    refFreqCSI-RS                             ARFCN-ValueNR
OPTIONAL,    -- Cond CSI-RS
    referenceSignalConfig                     ReferenceSignalConfig,
    absThreshSS-BlocksConsolidation           ThresholdNR
OPTIONAL,    -- Need R
    absThreshCSI-RS-Consolidation             ThresholdNR
OPTIONAL,    -- Need R
    nrofSS-BlocksToAverage                    INTEGER (2..maxNrofSS-
BlocksToAverage)                              OPTIONAL,    -- Need R
    nrofCSI-RS-ResourcesToAverage             INTEGER (2..maxNrofCSI-RS-
ResourcesToAverage)                       OPTIONAL,    -- Need R
    quantityConfigIndex                       INTEGER (1..maxNrofQuantityConfig),
    offsetMO                                  Q-OffsetRangeList,
    cellsToRemoveList                             PCI-List
OPTIONAL,    -- Need N
    cellsToAddModList                             CellsToAddModList
OPTIONAL,    -- Need N
    blackCellsToRemoveList                        PCI-RangeIndexList
OPTIONAL,    -- Need N
    blackCellsToAddModList                        SEQUENCE (SIZE (1..maxNrofPCI-
Ranges)) OF PCI-RangeElement          OPTIONAL,    -- Need N
    whiteCellsToRemoveList                        PCI-RangeIndexList
OPTIONAL,    -- Need N
    whiteCellsToAddModList                        SEQUENCE (SIZE (1..maxNrofPCI-
Ranges)) OF PCI-RangeElement          OPTIONAL,    -- Need N
    . . . ,
    [ [
    freqBandIndicatorNR                       FreqBandIndicatorNR
OPTIONAL,    -- Need R
    measCycleSCell                            ENUMERATED (sf160, sf256, sf320,
sf512, sf640, sf1024, sf1280}        OPTIONAL    -- Need R
    ] ],
    [ [
    smtc3list-r16                             SSB-MTC3List-r16
OPTIONAL,    -- Cond FFS
    rmtc-Config-r16                           SetupRelease {RMTC-Config-r16}
OPTIONAL,    -- Need M
    ssb-PositionQCL-Common-r16                SSB-PositionQCL-Relationship-r16
OPTIONAL,    -- Need M
    ssbPositionQCL-CellsToAddModList-r16          SSB-PositionQCL-
CellsToAddModList-r16                     OPTIONAL,    -- Need N
    ssb-PositionQCL-CellsToRemoveList-r16         PCI-List
```

-continued

```
OPTIONAL,     -- Need N
    t312-r16                            SetupRelease { T312-r16 }
OPTIONAL,     -- Need M
    ] ],
    [ [
    referenceSignalPositioningConfig-r17
ReferenceSignalPositioningConfig-r17
    ] ]
}
SSB-MTC3List-r16 : : =                  SEQUENCE (SIZE(1..4)) OF SSB-MTC3-r16
T312-r16 : : =                          ENUMERATED { ms0, ms50, ms100, ms200,
ms300, ms400, ms500, ms1000}
ReferenceSignalConfig : : =             SEQUENCE {
    ssb-ConfigMobility                      SSB-ConfigMobility
OPTIONAL,    -- Need M
    csi-rs-ResourceConfigMobility           SetupRelease { CSI-RS-
ResourceConfigMobility }                     OPTIONAL,    -- Need M
}
SSB-ConfigMobility : : =                SEQUENCE {
    ssb-ToMeasure                       SetupRelease { SSB-ToMeasure }
OPTIONAL,    -- Need M
    deriveSSB-IndexFromCell             BOOLEAN,
    ss-RSSI-Measurement                     SS-RSSI-Measurement
OPTIONAL,    -- Need M
    . . .
}
ReferenceSignalPositioningConfig-r17 : : =      SEQUENCE {
    csi-rs-ResourceConfigPositioning        SetupRelease { CSI-RS-
ResourceConfigPositioning }                  OPTIONAL,    -- Need M
}
Q-OffsetRangeList : : =                 SEQUENCE {
    rsrpOffsetSSB                           Q-OffsetRange            DEFAULT
dB0,
    rsrqOffsetSSB                           Q-OffsetRange            DEFAULT
dB0,
    sinrOffsetSSB                           Q-OffsetRange            DEFAULT
dB0,
    rsrpOffsetCSI-RS                        Q-OffsetRange            DEFAULT
dB0,
    rsrqOffsetCSI-RS                        Q-OffsetRange            DEFAULT
dB0,
    sinrOffsetCSI-RS                        Q-OffsetRange            DEFAULT
dB0
ThresholdNR : : =                       SEQUENCE{
    thresholdRSRP                           RSRP-Range
OPTIONAL,    -- Need R
    thresholdRSRQ                           RSRQ-Range
OPTIONAL,    -- Need R
    thresholdSINR                           SINR-Range
OPTIONAL, -- Need R
}
CellsToAddModList : : =                 SEQUENCE (SIZE (1..maxNrofCellMeas)) OF
CellsToAddMod
CellsToAddMod : : =                     SEQUENCE {
    physCellId                              PhysCellId,
    cellIndividualOffset                    Q-OffsetRangeList
}
RMTC-Config-r16 : : =                   SEQUENCE {
    rmtc-Periodicity-r16                    ENUMERATED {ms40, ms80, ms160, ms320,
ms 640},
    rmtc-SubframeOffset-r16                 INTEGER (0..639)
OPTIONAL,    -- Need M
    measDuration-r16                        ENUMERATED { sym1, sym14, sym28,
sym42, sym70},
    rmtc-MeasARFCN-r16                      ARFCN-ValueNR,
    . . .
}
SSB-PositionQCL-CellsToAddModList-r16 : : = SEQUENCE (SIZE
(1..maxNrofCellMeas)) OF SSB-PositionQCL-CellsToAdd-r16
SSB-PositionQCL-CellsToAdd-r16 : : = SEQUENCE {
    physCellId-r16                          PhysCellId,
    ssb-PositionQCL-r16                     SSB-PositionQCL-Relationship-r16
}
-- TAG-MEASOBJECTNR-STOP
-- ASN1STOP
```

Example (SI-RS-ResourceConfigPositioning

The IE CSI-RS-ResourceConfigPositioning is used to configure CSI-RS based positioning measurements.

multiple frequency layers and a measurement gap is needed to perform measurements on the DL-PRS. The need for measurement gap can introduce large latencies for position-

```
-- ASN1START
-- TAG-CSI-RS-RESOURCECONFIGPOSITIONING-START
CSI-RS-ResourceConfigPositioning-r17 : : =       SEQUENCE {
    subcarrierSpacing                            SubcarrierSpacing,
    csi-RS-TrpList-Positioning                   SEQUENCE (SIZE (1..maxNrofCSI-RS-
TRP)) OF CSI-RS-TrpPositioning,
    . . . ,
}
CSI-RS-TrpPositioning : : =                      SEQUENCE {
    trpId                                        INTEGER {1..8}
    csi-rs-MeasurementBW                         SEQUENCE {
        nrofPRBs                                     ENUMERATED { size24, size48,
size96, size192, size264},
        startPRB                                     INTEGER (0..2169)
    },
    density                                      ENUMERATED {d1, d3}
OPTIONAL, -- Need R
    csi-rs-ResourceList-Positioning              SEQUENCE (SIZE (1..maxNrofCSI-RS-
ResourcesPos)) OF CSI-RS-Resource-Positioning
}
CSI-RS-Resource-Positioning : : =               SEQUENCE {
    csi-RS-Index                                 CSI-RS-Index,
    slotConfig                                   CHOICE {
        ms4                                          INTEGER (0..31),
        ms5                                          INTEGER (0..39),
        ms10                                         INTEGER (0..79),
        ms20                                         INTEGER (0..159),
        ms40                                         INTEGER (0..319)
    },
    associatedSSB                                SEQUENCE {
        ssb-Index                                    SSB-Index,
        isQuasiColocated                             BOOLEAN
    }
OPTIONAL,    -- Need R
    frequencyDomainAllocation                    CHOICE {
        row1                                         BIT STRING (SIZE (4)),
        row2                                         BIT STRING (SIZE (12))
    },
    firstOFDMSymbolInTimeDomain                  INTEGER (0..13),
    sequenceGenerationConfig                     INTEGER (0..1023),
    . . .
}
CSI-RS-Index : : =                              INTEGER (0..maxNrofCSI-RS-Resources Pos-1)
-- TAG-CSI-RS-RESOURCECONFIGPOSITIONING-STOP
-- ASN1STOP
```

In the above embodiments, it is also possible to configure Tracking Reference Signal (TRS) to be used for positioning reference signal. If trs-info is set to "true" in any one of the NZP CSI-RS resource sets, this implies that the specific CSI-RS resources in the resource set are CSI-RS for tracking (i.e. TRS). Note that in some embodiments, a CSI-Report-PosConfig with the higher layer parameter reportQuantity set to one of the positioning measurements (e.g. ueRx-Tx, RSTD, etc.) is different from the current NR which restricts NZP CSI-RS resource sets configured with trs-info to be used for CSI related measurements or beam measurements. With the proposed embodiments, TRS can also be used for measuring and reporting positioning measurement in NR.

In further embodiments, the Release 16 DL-PRS configuration can be configured via RRC rather than via LPP to reduce the signaling overhead and reduce the latency. The serving gNB can provide the multi TRP configuration of DL-PRS in this case. Note that in existing NR, there can be ing measurements. In one variant of this embodiment, only one frequency layer for DL-PRS is configured which UE supports and thus avoids the need for measurement gaps and reducing the latency.

Instead of the existing LPP configuration which allows multiple frequency layer configurations, the proposed DL-PRS configuration via RRC shown below removes the configuration which allows multiple frequency layer configuration (i.e. a single frequency layer).

The serving gNB can configure the DL-PRS based upon the bandwidth part that UE supports (e.g. the DL-PRS is within the active BWP,) thus avoiding the need for measurement gap. RRC based UE specific DL-PRS configuration is provided to UE as shown below.

Example NR-DL-PRS-AssistanceData

The IE NR-DL-PRS-AssistanceData is used by the location server to provide DL-PRS assistance data.

```
-- ASN1START
NR-DL-PRS-AssistanceData-r16 : : = SEQUENCE {
    nr-DL-PRS-ReferenceInfo-r16 DL-PRS-IdInfo-r16    OPTIONAL,    -- Need ON
```

-continued

```
    nr-DL-PRS-AssistanceData-r16 NR-DL-PRS-AssistanceDataPerFreq-r16,
    nr-SSB-Config-r16        SEQUENCE (SIZE (0..255)) OF NR-SSB-Config-r16,
    . . .
}
NR-DL-PRS-AssistanceDataPerFreq-r16 : : = SEQUENCE {
    nr-DL-PRS-AssistanceDataPerFreq (SIZE (1..nrMaxTRPsPerFreq)) OF NR-DL-PRS-
AssistanceDataPerTRP-r16,
    nr-DL-PRS-PositioningFrequencyLayer-r16 NR-DL-PRS-
Positioning FrequencyLayer-r16    OPTIONAL,    -- Need ON
    . . .
}
NR-DL-PRS-AssistanceDataPerTRP-r16 : : = SEQUENCE {
    nr-DL-PRS-expectedRSTD-r16        INTEGER (−3841..3841),
    nr-DL-PRS-expectedRSTD-uncerainty-r16    INTEGER (−246..246),
    trp-ID-r16              TRP-ID-r16        OPTIONAL,
    nr-DL-PRS-Config-r16    NR-DL-PRS-Config-r16,
    . . .
}

NR-DL-PRS-Positioning FrequencyLayer-r16 : : = SEQUENCE {
    dl-PRS-SubcarrierSpacing-r16        ENUMERATED {kHz15, kHz30, kHz60, kHz120,
. . . },
    dl-PRS-ResourceBandwidth-r16        INTEGER (1..63),
    dl-PRS-StartPRB-r16                  INTEGER (0..2176),
    dl-PRS-PointA-r16                    ARFCN-ValueNR-r15,
    dl-PRS-CombSizeN-r16                ENUMERATED {n2, n4, n6, n12, . . . },
    dl-PRS-CyclicPrefix-r16              ENUMERATED {normal, extended, . . . },
    . . .
}
nrMaxFreqLayers    INTEGER : : = 4    -- Max freq layers
nrMaxTRPs PerFreq    INTEGER : : = 64    -- Max TRPs per freq layers
nrMaxResourceIDs    INTEGER : : = 64    -- Max ResourceIDs
-- ASN1STOP
```

Signaling Configuration

For a scenario with multiple TRPs in a serving cell and using the existing reference signal such as CSI-RS for positioning, the associated configuration is provided to UE via RRC. The configuration needs to be updated to include the multi-TRP aspects. An example ASN.1 was provided in ServingCellConfig example above. This covers the beam management or CSI reporting extension.

It is noted that multiple TRPs can be defined and each can have different configurations for CSI-RS.

Another approach is also considered where a dedicated CSI-RS configuration for positioning is provided.

Yet another approach where the DL-PRS, which has been designed in Release 16, is considered that includes configuring it based upon RRC and utilizing that for positioning measurements with reduced latency.

Positioning Measurement Request/Response

To reduce latency, instead of an LPP-based measurement request and measurement reporting, a MAC-based measurement request and faster reporting via L1 PUCCH/PUSCH may be desired. For Semi Persistent Positioning configuration using CSI-RS and UL-SRS, the gNB can configure the MAC CE A/D for positioning measurement request response.

It is possible to extend the existing MAC CE for Semi Persistent (SP) CSI reporting on PUCCH Activation/Deactivation MAC CE (TS 38.321). In such a case, one of the existing R bits can be re-purposed to express extension, or to indicate that it is used for positioning purpose.

Figure 5:
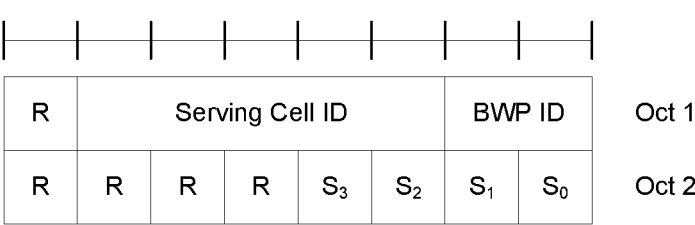
FIG. 5 is an example SP CSI reporting on PUCCH Activation/Deactivation MAC CE.

FIG. 5 illustrates an example SP CSI reporting on PUCCH Activation/Deactivation MAC CE. In some embodiments, it is also possible to define a new MAC CE rather than reusing an existing one. In such a case, a new LCID or e-LCID can be used.

In order to support the MAC based positioning measurement activation/deactivation, the necessary configuration has to be provided prior in RRC. An example ASN.1 was provided above for CSI-MeasConfig.

The DL MAC CE could also be used to provide the measurement results from gNB to UE. For example, gNB Rx-Tx, which may be needed for UE based positioning.

In UL, as such, the UE is supposed to provide the results via L1 PUCCH. However, depending upon PUCCH format, the payload size could be limited in such as UE encapsulates its measurement results in a MAC CE and provide to gNB. The gNB can configure which mechanism should be used.

Figure 6:
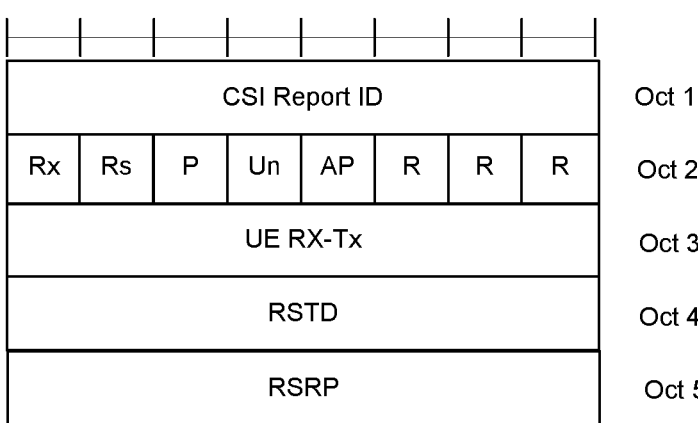
FIG. 6 is an example of MAC CE based multiple reporting.

The UE responds with the positioning measurement report on MAC CE as shown in FIG. 6. In the example MAC CE of FIG. 6, the CSI Report ID corresponds to the CSI-ReportConfigId corresponding to the (CSI-Report-PosConfig that is associated with the positioning measurement report.

The report ID (e.g. (CSI-ReportConfigId) can be used to identify the associated result for TRP ID or for a certain CSI-RS resource/configuration/NZP CSI-RS Resource Set (since the CSI-RS resource used for positioning measurement is given via (CSI-ReportPosConfig).

The second octet contains which report is included in the MAC CE. For example, if Rx is present, it implies that UE Rx-Tx is present. If it is 0; it can be implied that UE Rx-Tx is missing. This is applicable if via RRC multiple measurements are configured to be provided via MAC CE reporting. Similar flags can also be included in the MAC CE for other types of positioning measurements to be reported.

Figure 7:
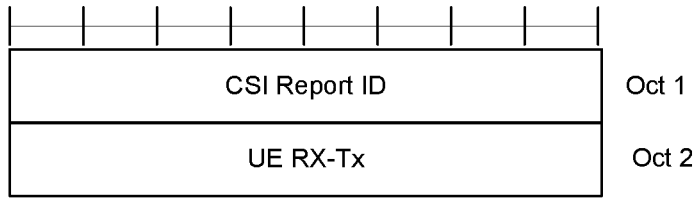
FIG. 7 is an example of MAC CE based single report.

In some embodiments, to simplify, only one measurement report can be configured to be reported, at a time and in such case the MAC CE report format would be simpler as shown in FIG. 7.

If the UE supports UE-based positioning method, in such cases the gNB may compute gNB Rx-Tx and provide the gNB Rx-Tx via DL MAC CE as a means for faster reporting rather than reporting to LMF via NRPP and the LMF sending the measurement result to the UE via LPP.

It is also possible to configure the measurement reporting via RRC especially for periodic reference signal configurations. RRC based measurement reporting is faster than LPP based and RRC layer (higher layer) can take specific actions such as trigger of aperiodic reference signal configurations based upon measurement report.

Security/Privacy Aspects

If a gNB is not allowed to compute positioning due to security/privacy aspects, then it is suggested that UE while providing Measurement Result splits into two parts. One part is quality of the measurement (such as RSRP) and uncertainty (such as ranging error in positioning estimation), and a second part is the actual measurement (such as UE Rx-Tx). The results can be split such that quality/uncertainty results are provided to gNB via MAC/RRC whereas the UE Rx-Tx can be provided to LMF via NAS signaling. LPP or NRPPa may also be considered.

Actions Based Upon Measurement Result

Upon receiving the measurement result(s) (at least the quality/uncertainty), the gNB checks whether the positioning still needs to be done (e.g. no end positioning received, or time duration left as provided by LMF during positioning setup). If so, the gNB can take actions such as configuring aperiodic CSI-RS for additional measurements if the quality was poor, or changing the spatial relations, or changing the TRPs, or increasing/decreasing the resources.

Figure 8:
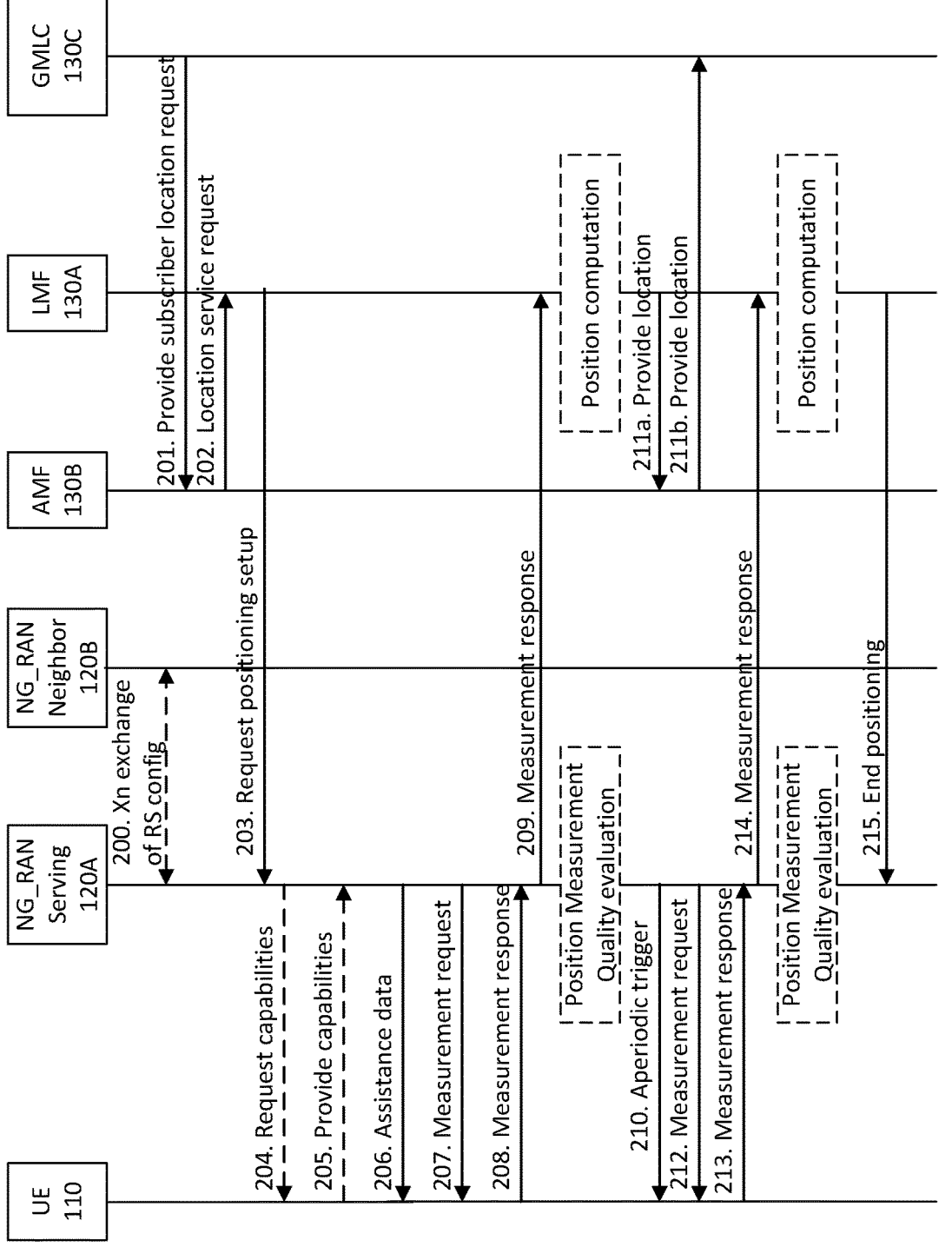
FIG. 8 is an example signaling diagram.

FIG. 8 is an example signaling diagram for reduced latency where the configuration is primarily based on RRC signaling.

Step 200 (optional): Exchange of RS configuration information via Xn interface. This step may not be needed for scenarios where multiple TRPs belong to the same serving cell. However, it is already available as part of legacy procedures.

Step 201: Transmit subscriber location request from GMLC to AMF.

Step 202: Transmit location service request from AMF to LMF.

It is noted that steps 201 and 202 are also existing legacy procedure steps.

Step 203: Request positioning setup/configuration. Either the AMF or LMF can inform the serving gNB that positioning is required for a specific UE/device.

Steps 204, 205: Exchange capability information. The Serving gNB can obtain the positioning related capabilities from the UE, if not already obtained from AMF, or by means of a context setup response message from AMF Step 206: Provide assistance data. The Serving gNB selects the positioning procedure either on its own or based at least in part on a recommendation from the LMF. Serving gNB provides the necessary configuration to the UE based upon the selected positioning procedure. The configuration can be based upon RRC. gNB can use existing CSI/beam management and RRM based reference signals (CSI-RS/ TRS, SSB) or configure the DL-PRS based upon RRC for positioning measurements.

Step 207: Transmit measurement request from the serving gNB to the UE. For semi-persistent and aperiodic configurations, the serving gNB can send a MAC CE or a DCI message for measurement request. For periodic configuration, the UE can provide the result based upon measurement interval/periodicity defined in RRC.

Step 208: The UE provides the requested measurement response to the gNB.

Step 209: Measurement response. Depending upon whether gNB is allowed to compute the position of the UE, it may compute the position itself and provide the result to one or more core network nodes (e.g. LMF). If the gNB is not allowed to compute the UE position, the measurement response is forwarded to the core network (e.g. LMF). In such a case, the measurement response can be an UL NAS message which is transparent to gNB.

The position can then be computed by the gNB or the core network node. The gNB can optionally perform a position measurement quality evaluation. The LMF can optionally provide the computed position/location to other core network nodes (e.g. AMF and/or GMLC).

Step 210: Aperiodic trigger. Depending upon the measurement quality, the gNB may take specific actions such as to change the current CSI-RS or UL SRS configuration, and/or increase or decrease the resources, etc.

Steps 211*a*, 211*b*: In parallel, in the core network, the AMF can provide the current position of the UE to GMLC.

Steps 212, 213, 214: Based upon a new configuration, a new measurement can be requested. The UE provides the new measurement result, and the steps 209 to 210 would repeat until the end of the positioning session. The gNB can provide any additional measurement response(s) to the core network.

Step 215: The positioning session ends, and a final UE location can be provided.

Figures 9, 10:
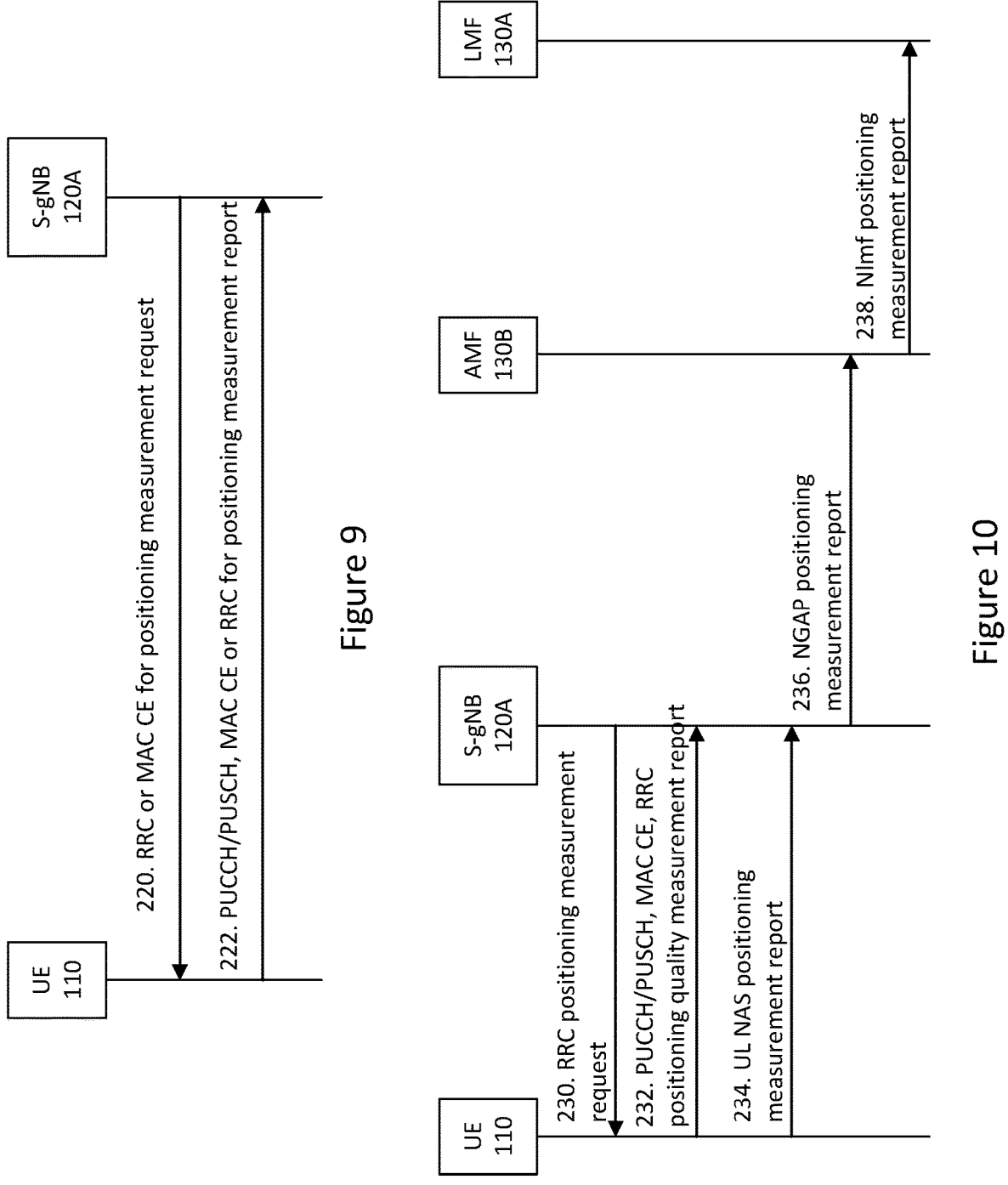
FIG. 9 is an example signaling diagram where position is calculated by the gNB.
FIG. 10 is an example signaling diagram where position is calculated by the core network.

FIG. 9 is an example signaling diagram for measurement request/response where the position is calculated by the gNB.

The UE receives a positioning measurement request message via RRC or MAC CE signaling from the gNB (step 220). The UE performs the measurement and transmits a positioning measurement report via RRC or MAC CE signaling on PUCCH/PUSCH to the gNB (step 222).

FIG. 10 is an example signaling diagram for measurement request/response where the position quality/uncertainty is provided to the gNB for quicker response/action (e.g. aperiodic trigger, etc.) and the measurements are provided to the LMF for positioning calculation via NAS signaling.

The UE receives a positioning measurement request via RRC signaling from the gNB. The UE can perform the measurements (step 230). The UE transmits a positioning quality measurement report via RRC or MAC CE signaling on PUCCH/PUSCH to the gNB (step 232). The UE transmits an UL NAS positioning measurement report to the gNB (step 234). The gNB transmits a NGAP positioning measurement report to the AMF (step 236). The AMF transmits a Nlmf Positioning Measurement Report to the LMF (step 238).

Figure 11:
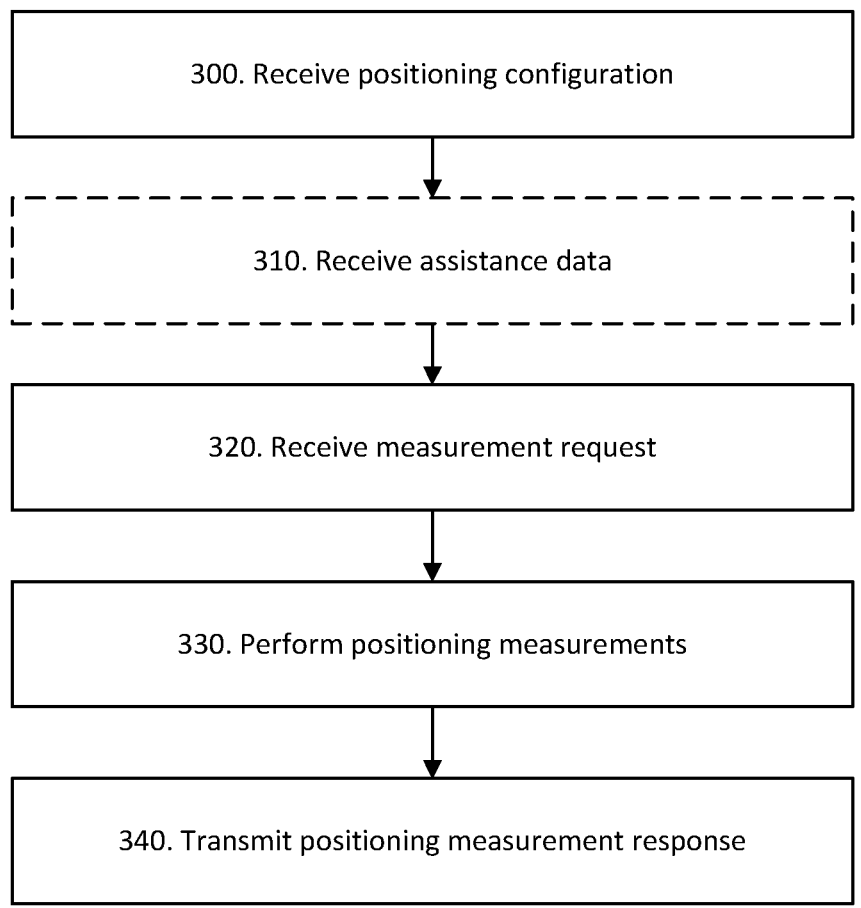
FIG. 11 is a flow chart illustrating a method which can be performed in a wireless device.

FIG. 11 is a flow chart illustrating a method which can be performed in a wireless device 110, such as a UE as described herein. The method can include:

Step 300: The wireless device receives positioning configuration information. The configuration can be received from an access node, such as a gNB. The configuration information can be received via RRC or MAC CE signaling and can include the various non-limiting messages and parameters as have been described herein. In some embodiments, the configuration information can include using reference signal configurations and signaling for positioning purposes. In some embodiments, the configuration information can include reference signal(s) for positioning associated with an active bandwidth part (BWP) of the wireless device and at least one TRP.

In some embodiments, the configuration information can include positioning measurement parameters (e.g. UE Rx-Tx, RSTD, RSRP, etc.) and/or quality measurement parameters (e.g. ueRx-TxPlusUncertainty, rstdPlusUncertainty, etc.). In some embodiments, the configuration information can include an extension to a CSI-RS or SSB resource set for positioning purposes.

Optionally, this step can further include exchanging capability information with one or more network nodes. This can include the wireless device receiving a capabilities request message from an access node, such as a gNB, and transmitting a capabilities response message to the gNB.

Step 310: In some embodiments, the configuration information of step 300 is provided as assistance data. Optionally, the wireless device can receive further positioning assistance data from the gNB.

Step 320: The wireless device receives a positioning measurement request message from a network node, such as an access node or a location server. In some embodiments, the positioning measurement request is one of a MAC CE message or a DCI message and can be received, for example, via RRC signaling.

Step 330: The wireless device performs the positioning measurement(s) in accordance with the positioning measurement request and/or the configuration information. In some embodiments, the wireless device can perform the positioning measurements without requesting for measurement gap.

Step 340: The wireless device transmits a positioning measurement response(s) to a network node (e.g. access node or location server). The response can include positioning measurements and/or measurement quality information. In some embodiments, the positioning measurement response can be a MAC CE message transmitted, for example, via RRC signaling.

In some embodiments, the wireless device can transmit positioning measurements to a network node (e.g. to the LMF via LPP) in a second positioning measurement response.

In some embodiments, the wireless device can further receive a positioning configuration change from the access node, for example, in response to the positioning measurement response. The positioning configuration change can include one or more of: aperiodic CSI-RS configuration, switching the BWP for measurements, increasing or decreasing resources, changing a spatial relation, and changing at least one TRP. The wireless device can perform/implement the positioning configuration change as instructed.

It will be appreciated that one or more of the above steps can be performed simultaneously and/or in a different order. Also, steps illustrated in dashed lines are optional and can be omitted in some embodiments.

Figure 12:
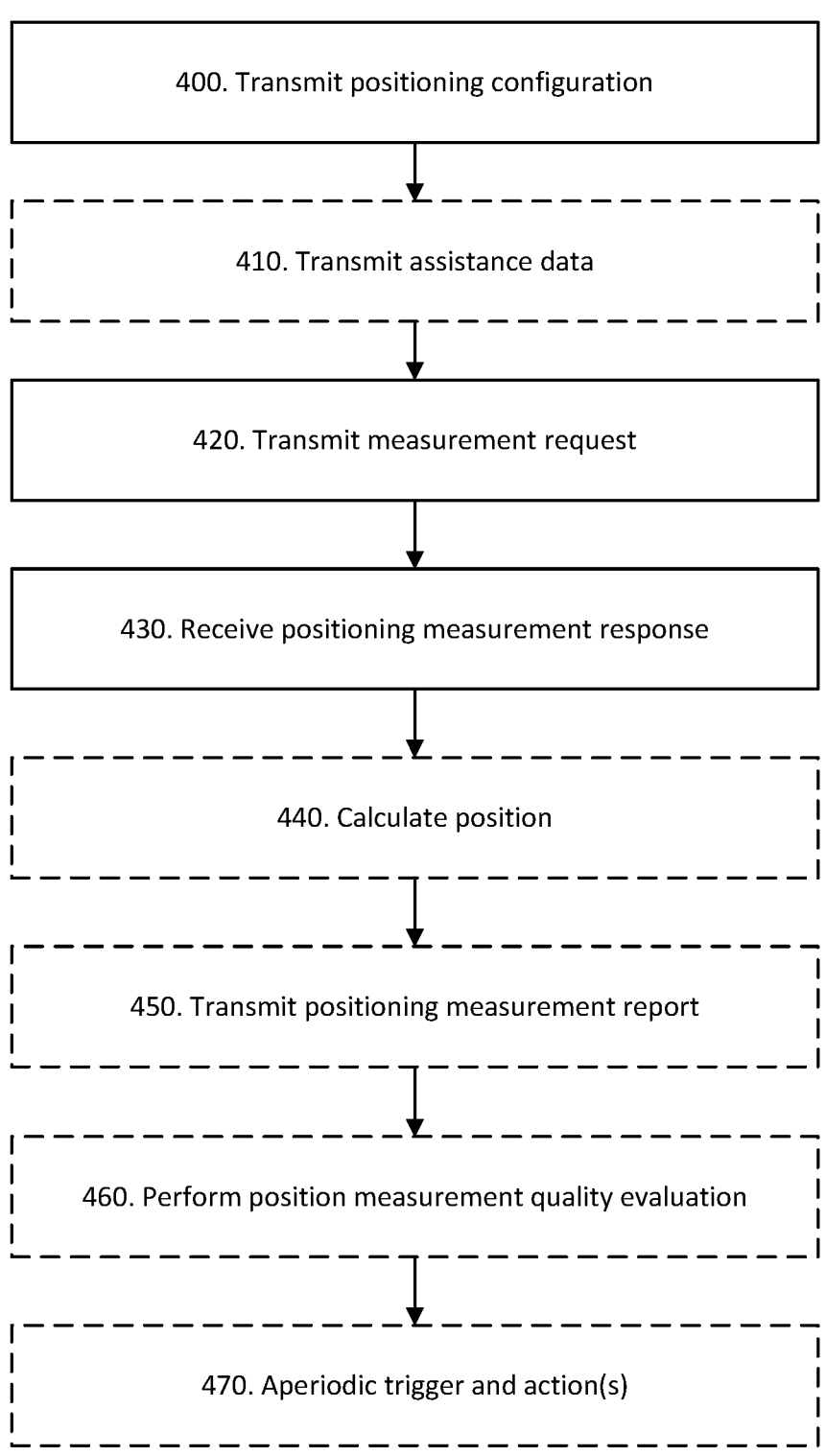
FIG. 12 is a flow chart illustrating a method which can be performed in an access node.

FIG. 12 is a flow chart illustrating a method which can be performed in a network node 120 as described herein. Network node 120 can be a radio access node 120 (base station, eNB, gNB). The method can include:

Step 400: The access node transmits positioning configuration information to one or more wireless devices. The configuration information can be transmitted via RRC or MAC CE signaling and can include the various non-limiting messages and parameters as have been described herein. In some embodiments, this can include using reference signal configurations and signaling for positioning purposes. In some embodiments, the configuration information can include reference signal(s) for positioning associated with an active BWP of the wireless device and at least one TRP.

In some embodiments, the configuration information can include positioning measurement parameters (e.g. UE Rx-Tx, RSTD, RSRP, etc.) and/or quality measurement parameters (e.g. ueRx-TxPlusUncertainty, rstdPlusUncertainty, etc.). In some embodiments, the configuration information can include an extension to a CSI-RS or SSB resource set for positioning purposes.

Optionally, this step can further include exchanging capability information with a wireless device.

Step 410: In some embodiments, the configuration information of step 400 is provided as assistance data. Optionally, the access node can transmit further positioning assistance data to the wireless device.

Step 420: The access node transmits a positioning measurement request message to the wireless device. In some embodiments, the positioning measurement request is one of a MAC CE message or a DCI message and can be transmitted, for example, via RRC signaling.

Step 430: The access node receives a positioning measurement response from the wireless device. The response can include positioning measurements and/or measurement quality information. In some embodiments, the positioning measurement response can be a MAC CE message received, for example, via RRC signaling.

Step 440: Optionally, in some embodiments, the access node calculates the position/location of the wireless device based at least in part on the received positioning measurement response and/or the configuration information.

Step 450: Optionally, the access node transmits a positioning measurement report to a network node, such as a core network node such an LMF. In some embodiments, when the access node calculates the location of the wireless device, the measurement report can include the calculated position. In other embodiments, the access node can forward the positioning measurements received from the wireless device to a network node such as the LMF.

Step 460: Optionally, the access node can perform a position measurement quality evaluation in accordance with the positioning measurement response.

Step 470: Optionally, the access node can trigger or initiate an action(s), such as performing a positioning configuration change, in accordance with the position measurement quality evaluation.

In some embodiments, the configuration change can include one or more of: aperiodic CSI-RS configuration, switching the BWP for measurements, increasing or decreasing resources, changing a spatial relation, and/or changing at least one TRP.

It will be appreciated that one or more of the above steps can be performed simultaneously and/or in a different order. Also, steps illustrated in dashed lines are optional and can be omitted in some embodiments.

Figure 13:
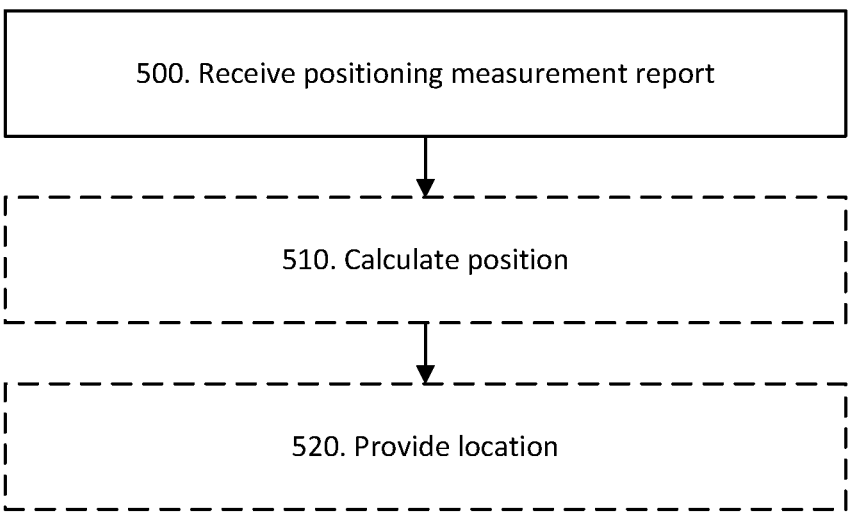
FIG. 13 is a flow chart illustrating a method which can be performed in a network node.

FIG. 13 is a flow chart illustrating a method which can be performed in a network node 130 as described herein. Network node 130 can be a location server 130 or another core network node such as an AMF, LMF, etc. The method can include:

Step 500: The network node receives a positioning measurement report. The report can be received from a wireless device, an access node (e.g. base station) or another network node. In some embodiments, the report can include positioning measurements. In other embodiments, the report can include a calculated position/location.

Step 510: Optionally, the network node calculates the position/location of a wireless device based at least in part on the received positioning measurement report.

Step 520: Optionally, the network node can provide the position/location of the wireless device to another core network node.

It will be appreciated that in some embodiments, the network node 130 can communicate (e.g. transmit/receive messages) directly with a wireless device 110. In other embodiments, messages and signals between the entities may be communicated via other nodes, such as radio access node(s) (e.g. gNB, eNB) 120 or other core network nodes.

It will be appreciated that one or more of the above steps can be performed simultaneously and/or in a different order. Also, steps illustrated in dashed lines are optional and can be omitted in some embodiments.

Some embodiments described herein include methods for configuring multi TRP based configuration in a serving cell for positioning and using the reference signals configurations for positioning purposes via RRC to reduce latency. Further, obtaining positioning measurement report via other protocols than the LPP to reduce latency and take timely actions (aperiodic trigger). If concerns for privacy/security exist, some embodiments include:

Splitting the measurement report into positioning measurement and positioning measurement quality.

Sending the measurement report needed for positioning calculation to LMF.

Sending the measurement quality to take immediate action to gNB.

Some embodiments include re-using already existing reference signal (CSI-RS/TRS) for positioning purpose.

Some embodiments include configuring the Positioning reference signal (DL-PRS) based upon RRC without having the need to have measurement gaps.

Some embodiments remove the dependency on NRPPa or Xn interchanges as a serving gNB based configuration can be used rather than involving LMF and/or neighbor gNBs.

Figure 14:
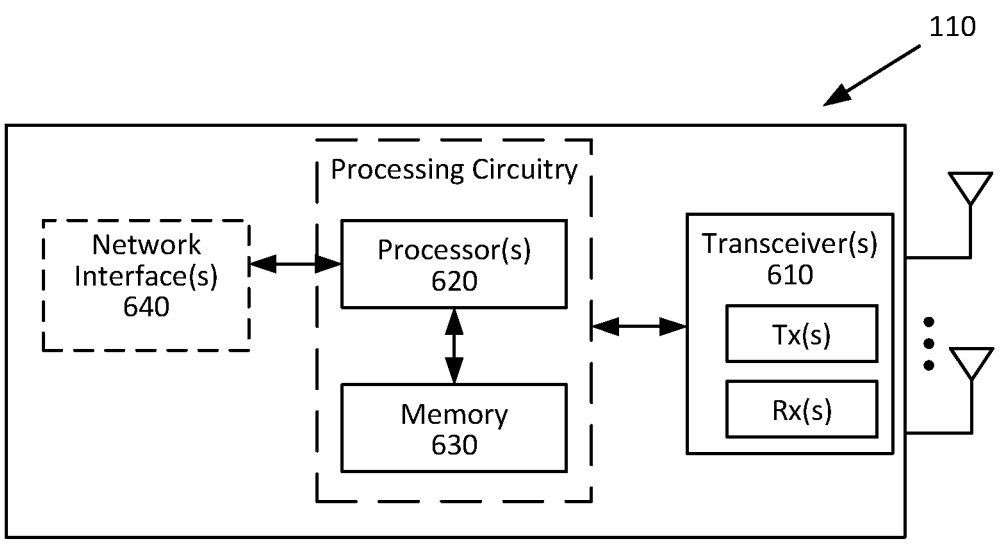
FIG. 14 is a block diagram of an example wireless device.

FIG. 14 is a block diagram of an example wireless device, UE 110, in accordance with certain embodiments. UE 110 includes a transceiver 610, processor 620, and memory 630. In some embodiments, the transceiver 610 facilitates transmitting wireless signals to and receiving wireless signals from radio access node 120 (e.g., via transmitter(s) (Tx), receiver(s) (Rx) and antenna(s)). The processor 620 executes instructions to provide some or all of the functionalities described above as being provided by UE, and the memory 630 stores the instructions executed by the processor 620. In some embodiments, the processor 620 and the memory 630 form processing circuitry.

The processor 620 can include any suitable combination of hardware to execute instructions and manipulate data to perform some or all of the described functions of a wireless device, such as the functions of UE 110 described above. In some embodiments, the processor 620 may include, for example, one or more computers, one or more central processing units (CPUs), one or more microprocessors, one or more application specific integrated circuits (ASICs), one or more field programmable gate arrays (FPGAs) and/or other logic.

The memory 630 is generally operable to store instructions, such as a computer program, software, an application including one or more of logic, rules, algorithms, code, tables, etc. and/or other instructions capable of being executed by a processor 620. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by the processor 620 of UE 110.

Other embodiments of UE 110 may include additional components beyond those shown in FIG. 14 that may be responsible for providing certain aspects of the wireless device's functionalities, including any of the functionalities described above and/or any additional functionalities (including any functionality necessary to support the solution described above). As just one example, UE 110 may include input devices and circuits, output devices, and one or more synchronization units or circuits, which may be part of the processor 620. Input devices include mechanisms for entry of data into UE 110. For example, input devices may include input mechanisms, such as a microphone, input elements, a display, etc. Output devices may include mechanisms for outputting data in audio, video and/or hard copy format. For example, output devices may include a speaker, a display, etc.

Figure 15:
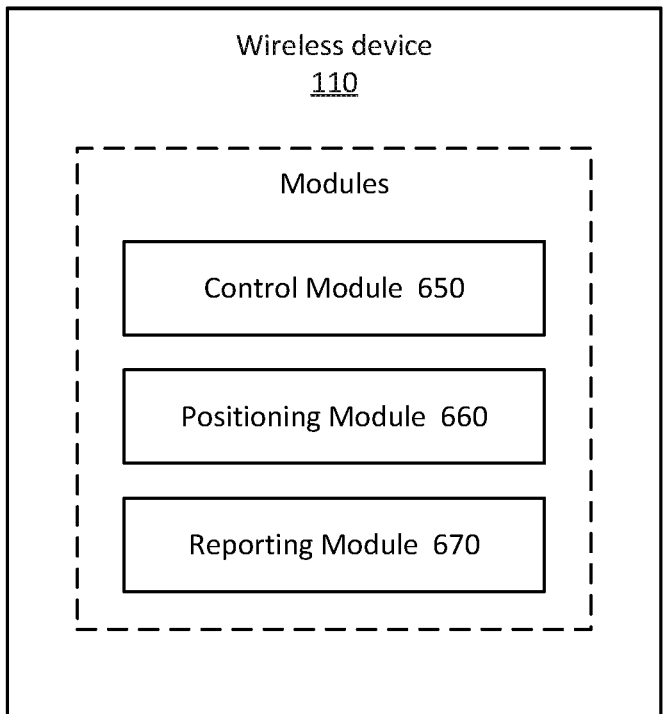
FIG. 15 is a block diagram of an example wireless device with modules

In some embodiments, the wireless device UE 110 may comprise a series of modules configured to implement the functionalities of the wireless device described above. Referring to FIG. 15, in some embodiments, the wireless device 110 may comprise a control module 650 for receiving and interpreting control/configuration/capability information, a positioning module 660 for performing positioning measurements and calculating an estimated position, and a reporting module 670 for reporting information associated with the positioning measurements.

It will be appreciated that the various modules may be implemented as combination of hardware and software, for instance, the processor, memory and transceiver(s) of UE 110 shown in FIG. 14. Some embodiments may also include additional modules to support additional and/or optional functionalities.

Figure 16:
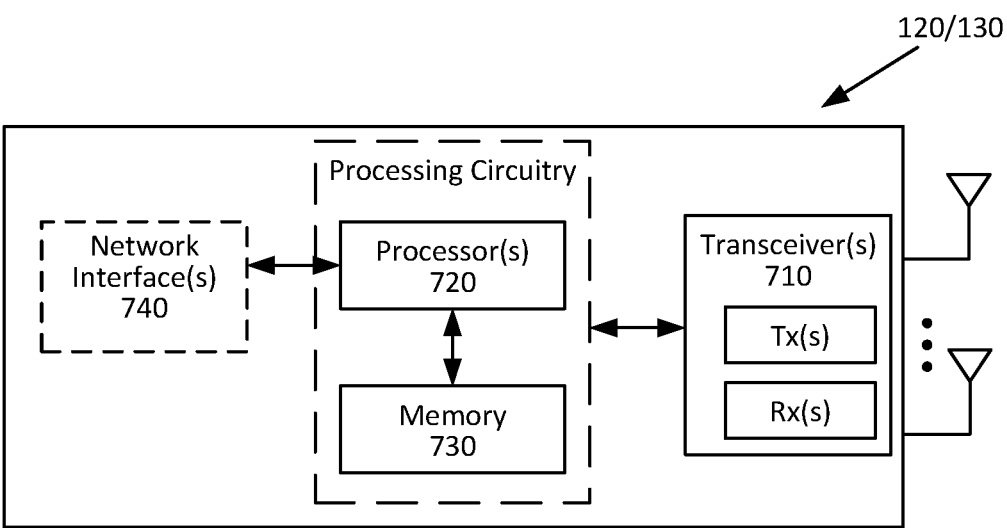
FIG. 16 is a block diagram of an example network node.

FIG. 16 is a block diagram of an exemplary network node 120/130. The exemplary node can be an access node 120 or a core network node (such as location server) 130, in accordance with certain embodiments described herein. Network node 120/130 may include one or more of a transceiver 710, processor 720, memory 730, and network interface 740. In some embodiments, the transceiver 710 facilitates transmitting wireless signals to and receiving wireless signals from wireless devices, such as UE 110 (e.g., via transmitter(s) (Tx), receiver(s) (Rx), and antenna(s)). The processor 720 executes instructions to provide some or all of the functionalities described above as being provided by network node 120/130, the memory 730 stores the instructions executed by the processor 720. In some embodiments, the processor 720 and the memory 730 form processing circuitry. The network interface 740 can communicate signals to backend network components, such as a gateway, switch, router, Internet, Public Switched Telephone Network (PSTN), core network nodes or radio network controllers, etc.

The processor 720 can include any suitable combination of hardware to execute instructions and manipulate data to perform some or all of the described functions of network node 120/130, such as those described above. In some embodiments, the processor 720 may include, for example, one or more computers, one or more central processing units (CPUs), one or more microprocessors, one or more application specific integrated circuits (ASICs), one or more field programmable gate arrays (FPGAs) and/or other logic.

The memory 730 is generally operable to store instructions, such as a computer program, software, an application including one or more of logic, rules, algorithms, code, tables, etc. and/or other instructions capable of being executed by a processor 720. Examples of memory 730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 740 is communicatively coupled to the processor 720 and may refer to any suitable device operable to receive input for node 120/130, send output from node 120/130, perform suitable processing of the input or output or both, communicate to other devices, or any combination of the preceding. The network interface 740 may include appropriate hardware (e.g., port, modem, network interface card, etc.) and software, including protocol conversion and data processing capabilities, to communicate through a network.

Other embodiments of network node 120/130 can include additional components beyond those shown in FIG. 16 that may be responsible for providing certain aspects of the node's functionalities, including any of the functionalities described above and/or any additional functionalities (including any functionality necessary to support the solutions described above). The various different types of network nodes may include components having the same physical hardware but configured (e.g., via programming) to support different radio access technologies, or may represent partly or entirely different physical components.

Processors, interfaces, and memory similar to those described with respect to FIG. 11 may be included in other network nodes (such as UE 110, radio access node 120, etc.). Other network nodes may optionally include or not include a wireless interface (such as the transceiver described in FIG. 11).

Figure 17:
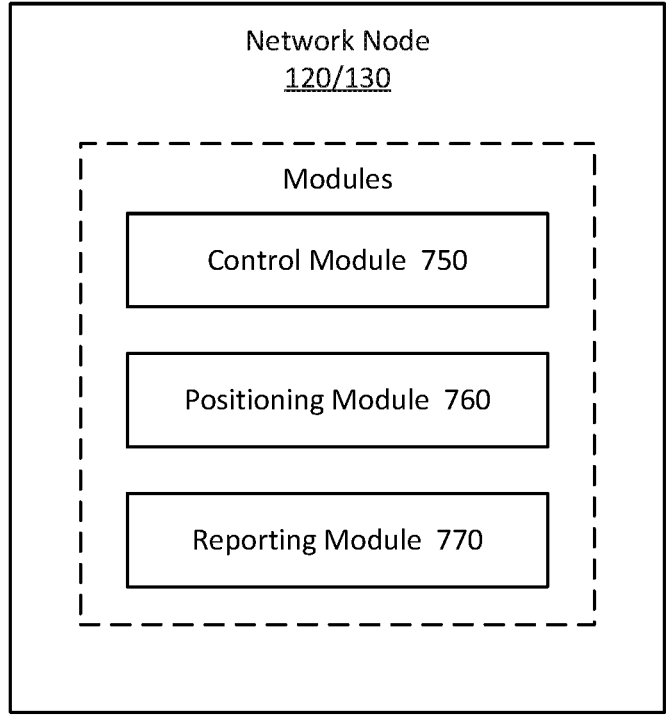
FIG. 17 is a block diagram of an example network node with modules.

In some embodiments, the network node 120/130, may comprise a series of modules configured to implement the functionalities of the network node described above. Referring to FIG. 17, in some embodiments, the network node 120/130 can comprise a control module 750 for transmitting, receiving and/or interpreting control/configuration/capability information, a positioning module 760 for calculating an estimated position based on measurements, and a reporting module 770 for transmitting/receiving information associated with the position and/or measurements.

It will be appreciated that the various modules may be implemented as combination of hardware and software, for instance, the processor, memory and transceiver(s) of network node 120/130 shown in FIG. 16. Some embodiments may also include additional modules to support additional and/or optional functionalities.

Figure 18:
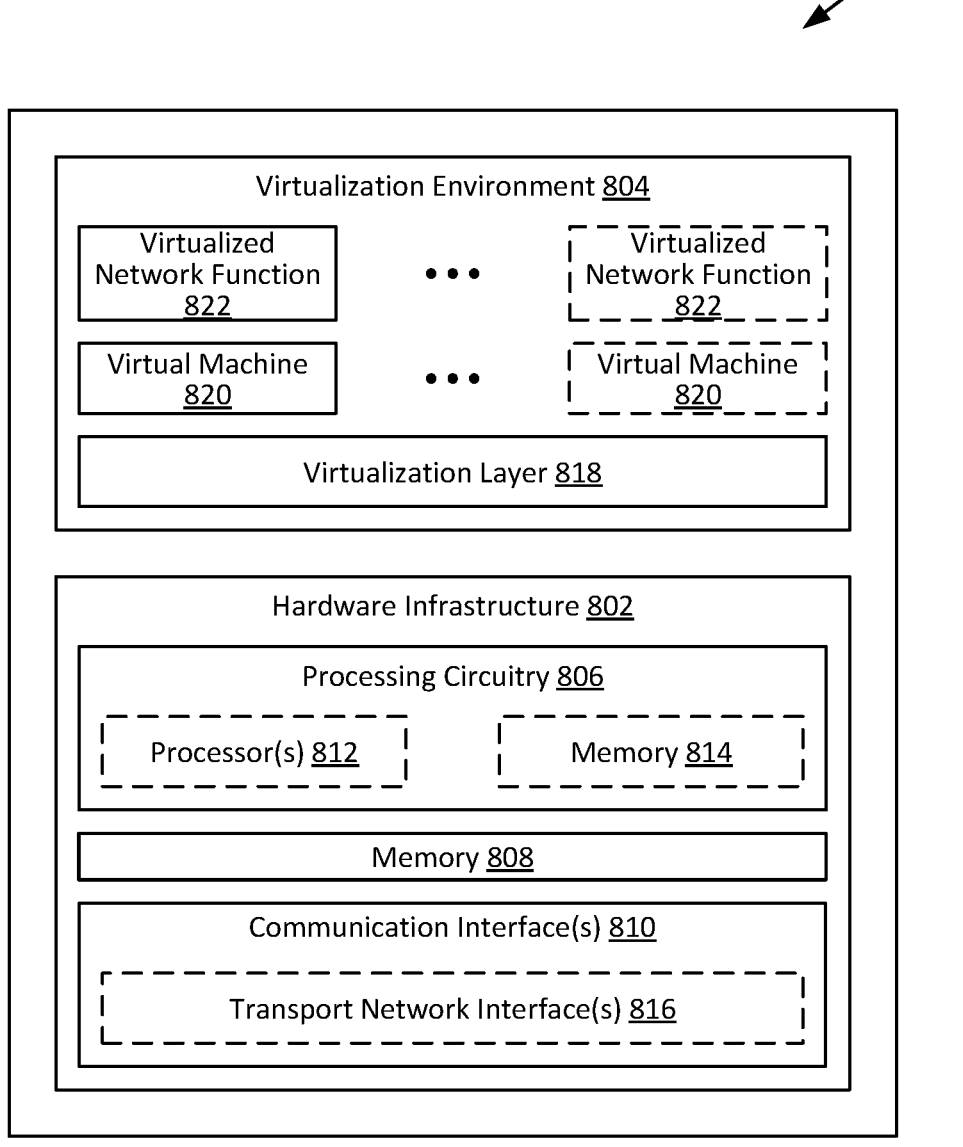
FIG. 18 is a block diagram of an example virtualized processing node.

Turning now to FIG. 18, some network nodes (e.g. UEs 110, radio access nodes 120, core network nodes 130, etc.) in the wireless communication network 100 may be partially or even entirely virtualized. As a virtualized entity, some or all the functions of a given network node are implemented as one or more virtual network functions (VNFs) running in virtual machines (VMs) hosted on a typically generic processing node 800 (or server).

Processing node 800 generally comprises a hardware infrastructure 802 supporting a virtualization environment 804.

The hardware infrastructure 802 generally comprises processing circuitry 806, a memory 808, and communication interface(s) 810.

Processing circuitry 806 typically provides overall control of the hardware infrastructure 802 of the virtualized processing node 800. Hence, processing circuitry 806 is generally responsible for the various functions of the hardware infrastructure 802 either directly or indirectly via one or more other components of the processing node 800 (e.g. sending or receiving messages via the communication interface 810). The processing circuitry 806 is also responsible for enabling, supporting and managing the virtualization environment 804 in which the various VNFs are run. The processing circuitry 806 may include any suitable combination of hardware to enable the hardware infrastructure 802 of the virtualized processing node 800 to perform its functions.

In some embodiments, the processing circuitry 806 may comprise at least one processor 812 and at least one memory 814. Examples of processor 812 include, but are not limited to, a central processing unit (CPU), a graphical processing unit (GPU), and other forms of processing unit. Examples of memory 814 include, but are not limited to, Random Access Memory (RAM) and Read Only Memory (ROM). When processing circuitry 806 comprises memory 814, memory 814 is generally configured to store instructions or codes executable by processor 812, and possibly operational data. Processor 812 is then configured to execute the stored instructions and possibly create, transform, or otherwise manipulate data to enable the hardware infrastructure 802 of the virtualized processing node 800 to perform its functions.

Additionally, or alternatively, in some embodiments, the processing circuitry 806 may comprise, or further comprise, one or more application-specific integrated circuits (ASICs), one or more complex programmable logic device (CPLDs), one or more field-programmable gate arrays (FPGAs), or other forms of application-specific and/or programmable circuitry. When the processing circuitry 806 comprises application-specific and/or programmable circuitry (e.g., ASICS, FPGAs), the hardware infrastructure 802 of the virtualized processing node 800 may perform its functions without the need for instructions or codes as the necessary instructions may already be hardwired or preprogrammed into processing circuitry 806. Understandably, processing circuitry 806 may comprise a combination of processor(s) 812, memory(ies) 814, and other application-specific and/or programmable circuitry.

The communication interface(s) 810 enable the virtualized processing node 800 to send messages to and receive messages from other network nodes (e.g., radio network nodes, other core network nodes, servers, etc.). In that sense, the communication interface 810 generally comprises the necessary hardware and software to process messages received from the processing circuitry 806 to be sent by the virtualized processing node 800 into a format appropriate for the underlying transport network and, conversely, to process messages received from other network nodes over the underlying transport network into a format appropriate for the processing circuitry 806. Hence, communication interface 810 may comprise appropriate hardware, such as transport network interface(s) 816 (e.g., port, modem, network interface card, etc.), and software, including protocol conversion and data processing capabilities, to communicate with other network nodes.

The virtualization environment 804 is enabled by instructions or codes stored on memory 808 and/or memory 814. The virtualization environment 804 generally comprises a virtualization layer 818 (also referred to as a hypervisor), at least one virtual machine 820, and at least one VNF 822. The functions of the processing node 800 may be implemented by one or more VNFs 822.

Some embodiments may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause processing circuitry (e.g. a processor) to perform steps in a method according to one or more embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description.

Glossary

The present description may comprise one or more of the following abbreviation:

3GPP Third Generation Partnership Project
ACK Acknowledgement
AP Access Point
ARQ Automatic Repeat Request
BS Base Station
BSC Base Station Controller
BSR Buffer Status Report
BTS Base Transceiver Station
CA Carrier Aggregation
CC Component Carrier
CCCH SDU Common Control Channel SDU
CG Configured Grant
CGI Cell Global Identifier
CN Core Network
CQI Channel Quality information
CSI Channel State Information
CU Central Unit
DAS Distributed Antenna System
DC Dual Connectivity
DCCH Dedicated Control Channel
DCI Downlink Control Information
DL Downlink
DMRS Demodulation Reference Signal
DU Distributed Unit
eMBB Enhanced Mobile Broadband
eNB E-UTRAN NodeB or evolved NodeB
ePDCCH enhanced Physical Downlink Control Channel
E-SMLC evolved Serving Mobile Location Center
E-UTRA Evolved UTRA
E-UTRAN Evolved UTRAN
FDM Frequency Division Multiplexing
HARQ Hybrid Automatic Repeat Request
HO Handover
IAB Integrated Access Backhaul
IoT Internet of Things
LCH Logical Channel
LTE Long-Term Evolution
M2M Machine to Machine
MAC Medium Access Control MBMS Multimedia Broadcast Multicast Services
MCG Master Cell Group
MDT Minimization of Drive Tests
MeNB Master eNode B
MME Mobility Management Entity
MSC Mobile Switching Center
MSR Multi-standard Radio
MTC Machine Type Communication
NACK Negative Acknowledgement
NDI Next Data Indicator
NR New Radio
O&M Operation and Maintenance
OFDM Orthogonal Frequency Division Multiplexing
OFDMA Orthogonal Frequency Division Multiple Access
OSS Operations Support System
PCC Primary Component Carrier
P-CCPCH Primary Common Control Physical Channel
PCell Primary Cell
PCG Primary Cell Group
PCH Paging Channel
PCI Physical Cell Identity
PDCCH Physical Downlink Control Channel
PDCP Packet Data Convergence Protocol
PDSCH Physical Downlink Shared Channel
PDU Protocol Data Unit
PGW Packet Gateway
PHICH Physical HARQ indication channel
PMI Precoder Matrix Indicator
ProSe Proximity Service
PSC Primary Serving Cell
PSCell Primary SCell
PUCCH Physical Uplink Control Channel
PUSCH Physical Uplink Shared Channel
RAT Radio Access Technology
RB Resource Block
RF Radio Frequency
RLC Radio Link Control
RLM Radio Link Management
RNC Radio Network Controller
RRC Radio Resource Control
RRH Remote Radio Head
RRM Radio Resource Management
RRU Remote Radio Unit
RSRP Reference Signal Received Power
RSRQ Reference Signal Received Quality
RSSI Received Signal Strength Indicator
RSTD Reference Signal Time Difference
RTT Round Trip Time
SCC Secondary Component Carrier
SCell Secondary Cell
SCG Secondary Cell Group
SCH Synchronization Channel
SDU Service Data Unit
SeNB Secondary eNodeB
SGW Serving Gateway
SI System Information
SIB System Information Block
SINR Signal to Interference and Noise Ratio
SNR Signal Noise Ratio
SPS Semi-persistent Scheduling
SON Self-organizing Network
SR Scheduling Request
SRS Sounding Reference Signal
SSC Secondary Serving Cell
TB Transport Block
TTI Transmission Time Interval
Tx Transmitter UE User Equipment
UL Uplink
URLLC Ultra-Reliable Low Latency Communication
UTRA Universal Terrestrial Radio Access
UTRAN Universal Terrestrial Radio Access Network
V2V Vehicle-to-Vehicle
V2X Vehicle-to-Everything
WLAN Wireless Local Area Network

The invention claimed is:

1. A method performed by an access node, the method comprising:

transmitting, to a wireless device, configuration information including a reference signal (RS) for positioning associated with an active bandwidth part (BWP) of the wireless device and at least one Transmission/Reception Point (TRP);

transmitting, to the wireless device, a positioning measurement request;

receiving, from the wireless device, a positioning measurement response including measurement quality information;

evaluating position measurement quality in accordance with the positioning measurement response; and responsive to evaluating the position measurement quality, initiating a positioning configuration change.

2. The method of claim 1, wherein the positioning configuration change includes one or more of: aperiodic CSI-RS configuration, switching the BWP for measurements, increasing or decreasing resources, changing a spatial relation, and changing at least one TRP.

3. The method of claim 1, further comprising, receiving, from a network node, positioning configuration including one or more of: a quality of service for positioning, a duration of positioning, and a measurement response periodicity.

4. A method performed by a wireless device, the method comprising:

receiving, from an access node, configuration information including a reference signal (RS) for positioning associated with an active bandwidth part (BWP) of the wireless device and at least one Transmission/Reception Point (TRP);

receiving, from the access node, a positioning measurement request;

performing positioning measurements in accordance with at least one of the configuration information and the positioning measurement request message;

transmitting, to the access node, a positioning measurement response including measurement quality information; and receiving, from the access node, a positioning configuration change.

5. The method of claim 4, wherein the configuration information is received via Radio Resource Control (RRC) signaling.

6. The method of claim 4, wherein the configuration information is one of: a serving cell configuration message, a Channel State Information (CSI) measurement configuration message, a CSI reporting configuration message, a CSI resource configuration message, a measurement object message, and a positioning CSI-RS assistance data message.

7. The method of claim 4, wherein the configuration information is one of: a serving cell configuration message, a Positioning Reference Signal (PRS) measurement configuration message, a PRS reporting configuration message, a PRS resource configuration message, a measurement object message, and a PRS assistance data message.

8. The method of claim 4, wherein the configuration information includes one or more of: positioning measurement parameters and quality measurement parameters.

9. The method of claim 4, wherein the configuration information includes an extension to a Channel State Information Reference Signal (CSI-RS) or Synchronization Signal Block (SSB) resource set for positioning purposes.

10. The method of claim 4, wherein the positioning measurement request is one of a Medium Access Control (MAC) Control Element (CE) message or a Downlink Control Information (DCI) message.

11. The method of claim 4, further comprising, performing the positioning measurements without requesting for measurement gap.

12. The method of claim 4, wherein the positioning measurement response is a MAC CE message.

13. The method of claim 4, wherein the positioning measurement response further includes positioning measurements.

14. The method of claim 4, further comprising, transmitting positioning measurements to a network node.

15. A wireless device comprising a radio interface and processing circuitry configured to:

receive, from an access node, configuration information including a reference signal (RS) for positioning associated with an active bandwidth part (BWP) of the wireless device and at least one Transmission/Reception Point (TRP);

receive, from the access node, a positioning measurement request;

perform positioning measurements in accordance with at least one of the configuration information and the positioning measurement request message;

transmit, to the access node, a positioning measurement response including measurement quality information; and receive, from the access node, a positioning configuration change.

16. The wireless device of claim 15, wherein the configuration information is received via Radio Resource Control (RRC) signaling.

17. The wireless device of claim 15, wherein the configuration information is one of: a serving cell configuration message, a Channel State Information (CSI) measurement configuration message, a CSI reporting configuration message, a CSI resource configuration message, a measurement object message, and a positioning CSI-RS assistance data message.

18. The wireless device of claim 15, wherein the configuration information is one of: a serving cell configuration message, a Positioning Reference Signal (PRS) measurement configuration message, a PRS reporting configuration message, a PRS resource configuration message, a measurement object message, and a PRS assistance data message.

19. The wireless device of claim 15, wherein the configuration information includes one or more of: positioning measurement parameters and quality measurement parameters.

20. The wireless device of claim 15, wherein the configuration information includes an extension to a Channel State Information Reference Signal (CSI-RS) or Synchronization Signal Block (SSB) resource set for positioning purposes.

21. The wireless device of claim 15, wherein the positioning measurement request is one of a Medium Access Control (MAC) Control Element (CE) message or a Downlink Control Information (DCI) message.

22. The wireless device of claim 15, further configured to perform the positioning measurements without requesting for measurement gap.

23. The wireless device of claim 15, wherein the positioning measurement response is a MAC CE message.

24. The wireless device of claim 15, wherein the positioning measurement response further includes positioning measurements.

25. The wireless device of claim 15, further configured to transmit positioning measurements to a network node.

\* \* \* \* \*